US011655830B2

United States Patent
Nonaka et al.

(10) Patent No.: US 11,655,830 B2
(45) Date of Patent: May 23, 2023

(54) VACUUM PUMP, AND BLADE COMPONENT, ROTOR, AND STATIONARY BLADE USED THEREIN

(71) Applicant: Edwards Japan Limited, Chiba (JP)

(72) Inventors: Manabu Nonaka, Chiba (JP); Hideki Enosawa, Chiba (JP)

(73) Assignee: Edwards Japan Limited, Chiba (JP)

( * ) Notice: Subject to any disclaimer, the term of this patent is extended or adjusted under 35 U.S.C. 154(b) by 118 days.

(21) Appl. No.: 16/495,009

(22) PCT Filed: Mar. 19, 2018

(86) PCT No.: PCT/JP2018/010835
§ 371 (c)(1),
(2) Date: Sep. 17, 2019

(87) PCT Pub. No.: WO2018/174013
PCT Pub. Date: Sep. 27, 2018

(65) Prior Publication Data
US 2020/0271132 A1    Aug. 27, 2020

(30) Foreign Application Priority Data

Mar. 23, 2017  (JP) .............................. JP2017-056862
Oct. 5, 2017  (JP) .............................. JP2017-194834
Mar. 14, 2018  (JP) .............................. JP2018-046156

(51) Int. Cl.
*F04D 19/04*     (2006.01)
*F04D 29/32*     (2006.01)
*F04D 29/70*     (2006.01)

(52) U.S. Cl.
CPC ........... *F04D 29/701* (2013.01); *F04D 19/04* (2013.01); *F04D 19/042* (2013.01); *F04D 29/324* (2013.01); *F05B 2240/30* (2013.01)

(58) Field of Classification Search
CPC ........ F04D 19/04; F04D 19/042; F04D 29/32; F04D 29/327; F04D 29/328;
(Continued)

(56) References Cited

U.S. PATENT DOCUMENTS 5,190,438 A *  3/1993 Taniyama ............. F04C 29/025
                                              415/90
6,607,365 B1 *  8/2003 Kabasawa ............... F04D 19/04
                                              417/295
(Continued)

FOREIGN PATENT DOCUMENTS

JP    S6361799 A    3/1988
JP    H05272488 A   10/1993
(Continued)

OTHER PUBLICATIONS

Sekida et al, machine translation of JP 2007-198205, published Aug. 9, 2007 (Year: 2007).*

(Continued)

*Primary Examiner* — David E Sosnowski
*Assistant Examiner* — Jason G Davis
(74) *Attorney, Agent, or Firm* — Theodore M. Magee; Westman, Champlin & Koehler, P.A.

(57) ABSTRACT

A vacuum pump includes a plurality of exhaust stages provided between an inlet port and an exhaust port so as to function as means for exhausting gas molecules, and a number of blades provided between the inlet port and an uppermost exhaust stage of the plurality of exhaust stages so as to rotate together with a rotary blade that constitutes the uppermost exhaust stage as a particle transport stage for transporting particles in an exhaust direction of the gas molecules, the number being smaller than the number of rotary blades that constitutes the uppermost exhaust stage.

19 Claims, 20 Drawing Sheets

(58) Field of Classification Search
CPC .... F04D 29/384; F04D 29/386; F04D 29/544; F04D 29/701
See application file for complete search history.

(56) References Cited

U.S. PATENT DOCUMENTS

| | | | | |
|---|---|---|---|---|
| 6,932,564 | B2* | 8/2005 | Davis | B82Y 15/00 |
| | | | | 415/90 |
| 2005/0002776 | A1 | 1/2005 | Davis | |
| 2010/0192857 | A1 | 8/2010 | Kobayashi et al. | |
| 2010/0266426 | A1 | 10/2010 | Hablanian | |
| 2012/0034066 | A1* | 2/2012 | Kogame | F04D 19/04 |
| | | | | 415/90 |

FOREIGN PATENT DOCUMENTS

| | | |
|---|---|---|
| JP | 2000337290 A | 12/2000 |
| JP | 2004019493 A | 1/2004 |
| JP | 2006511758 A | 4/2006 |
| JP | 2007198205 A | 8/2007 |
| JP | 2010174779 A | 8/2010 |
| WO | 2008065798 A1 | 3/2010 |

OTHER PUBLICATIONS

European Communication dated Nov. 20, 2020 and European Search Report dated Nov. 11, 2020 for corresponding European Application Serial No. EP18771375.
PCT International Search Report dated Jun. 19, 2018 for corresponding PCT Application No. PCT/JP2018/010835.
PCT International Written Opinion dated Jun. 19, 2018 for corresponding PCT Application No. PCT/JP2018/010835.

* cited by examiner

US 11,655,830 B2

VACUUM PUMP, AND BLADE COMPONENT, ROTOR, AND STATIONARY BLADE USED THEREIN

CROSS-REFERENCE OF RELATED APPLICATION

This application is a Section 371 National Stage Application of International Application No. PCT/JP2018/010835, filed Mar. 19, 2018, which is incorporated by reference in its entirety and published as WO 2018/174013 A1 on Sep. 27, 2018 and which claims priority of Japanese Application Nos. 2017-056862, filed Mar. 23, 2017, 2017-194834, filed Oct. 5, 2017 and 2018-046156, filed Mar. 14, 2018.

BACKGROUND

The present invention relates to a vacuum pump used as a gas exhaust means of a process chamber and other vacuum chambers in a semiconductor manufacturing apparatus, a flat panel display manufacturing apparatus, and a solar panel manufacturing apparatus. Particularly, the present invention relates to a vacuum pump which can effectively prevent backflow of particles from the vacuum pump to the chambers without impairing a gas molecule exhaust performance of the vacuum pump and which is ideal for preventing contamination of the inside of the chambers due to back-flowing particles.

A vacuum pump such as a turbo-molecular pump or a thread groove-type pump is often used for exhausting a vacuum chamber which requires high vacuum. FIG. 18 is a schematic diagram of an exhaust system which employs a conventional vacuum pump as a gas exhaust means of a vacuum chamber, FIG. 19A is a schematic diagram illustrating a state in which a rotary blade of an uppermost exhaust stage of the conventional vacuum pump illustrated in FIG. 18 is seen from a direction indicated by arrow D in FIG. 18, and FIG. 19B is an enlarged view of a blade edge positioned on an upper end surface side (an inlet port side) of the rotary blade illustrated in FIG. 19A.

A conventional vacuum pump Z that constitutes the exhaust system illustrated in FIG. 18 has a plurality of exhaust stages PT provided between an inlet port 2 and an exhaust port 3 so as to functions as means for exhausting gas molecules.

The exhaust stages PT of the conventional vacuum pump Z have a structure in which gas molecules are exhausted by a plurality of rotary blades 7 and a plurality of stationary blades 8 arranged at a predetermined interval in a radial form in respective exhaust stages PT.

In the above-described gas molecule exhaust structure, the rotary blades 7 are formed integrally on an outer peripheral surface of a rotor 6 which is rotatably supported by a bearing means such as a magnetic bearing and rotate at a high speed together with the rotor 6. On the other hand, the stationary blades 8 are fixed to an inner surface of the outer case 1 (for example, see Japanese Patent No. 5463037).

However, in the exhaust system illustrated in FIG. 18, it is assumed that a chemical process such as CVD is performed in a vacuum chamber CH, and fine particulate process byproducts generated secondarily due to the chemical process float and spread in the vacuum chamber CH and fall toward the inlet port 2 of the vacuum pump Z by the weight thereof or a transport effect of gas molecules. It is also assumed that deposits attached and deposited to an inner wall surface of the vacuum chamber CH and deposits attached and deposited to a pressure adjustment valve BL peel off due to vibration or the like and fall toward the inlet port 2 of the vacuum pump Z.

Moreover, the particles having reached the inlet port 2 due to the falling fall further from the inlet port 2 and enter an uppermost exhaust stage PT (PT1) as illustrated in FIG. 19A. When the entering particles Pa collide with the rotary blade 7 of the exhaust stage PT (PT1) rotating at a high speed, the colliding particles may bounce due to collision with a blade edge EG positioned on the upper end surface side of the rotary blade 7 and rebound and flow back toward the inlet port 2 as illustrated in FIG. 19B, and the inside of the vacuum chamber CH may be contaminated by the back-flowing particles.

As means for preventing contamination of the inside of the vacuum chamber CH due to the back-flowing particles, in the conventional vacuum pump Z, a rotary blade 7 illustrated in FIG. 19B, for example, is employed as a specific configuration of the rotary blades 7 that form the uppermost exhaust stage PT (PT1).

In the rotary blade 7 illustrated in FIG. 19B, a chamfered portion MS formed by machining the blade edge EG is provided as means for decreasing the proportion of the back-flowing particles (for example, see Japanese Patent No. 5463037).

However, referring to paragraphs 0026 to 0027 of Japanese Patent No. 5463037, a particle collidable region near the blade edge EG of the rotary blade 7 is very small (0.3 mm or smaller). The collidable region has the same size as a chamfered portion of an edge which can be manufactured by machining in a practical (mass-producible) perspective.

In the conventional vacuum pump disclosed in Japanese Patent No. 5463037, a chamfering range of a chamfered portion is restricted to the very small collidable region and the chamfered surface is formed to be parallel (see FIG. 19B of the present application) to an axial direction of a rotating body (4) or to face downward, which is a gas exhausting direction (see FIG. 20 of the present application) in order to decrease a probability of particles to be reflected toward the inlet port side.

However, it is inevitable that an upper portion MC of the chamfered portion MS has a convex circular arc surface shape due to bluntness of an edge portion formed during machining of the chamfered portion MS and plating for enhancing corrosion resistance of the surface of the rotary blade 7. Particles falling on such a convex circular arc surface bounce by colliding with the convex circular arc surface and rebound toward the inlet port 2 and backflows in the direction of the vacuum chamber CH. Therefore, similarly to the conventional vacuum pump disclosed in Japanese Patent No. 5463037, according to a configuration in which the chamfered portion MS is provided in the blade edge EG, it is not possible to effectively prevent backflow of particles from the vacuum pump Z to the vacuum chamber CH and contamination of the inside of the vacuum chamber CH due to back-flowing particles is not prevented sufficiently.

Particularly, according to FIGS. 1 to 3 of Japanese Patent No. 5463037, since a chamfered surface (28a) of a chamfered portion is formed to be parallel to an axial direction of a rotating body (4) or to face downward (a molecule exhaust direction) as described above, particles are reflected in a horizontal direction or a slightly downstream direction after entering the chamfered surface (28a). In this case, since the velocity in a downstream direction of the particles is small, the particles after reflection may collide again with a rear surface (an inclined surface facing an inlet port direction on a back side of a rotation direction, the same hereinbelow) of a rotary blade (a left-side rotary blade 28 in FIG. 3 of Japanese Patent No. 5463037) on a front side of the rotation direction and are reflected again toward the inlet port.

As a configuration for decreasing the proportion of buffer layers, a configuration of increasing an overall arrangement interval of the rotary blades 7 that form the uppermost exhaust stage PT (PT1) and a configuration of decreasing a peripheral velocity of the rotary blade 7 may be considered. However, according to these configurations, a problem that a gas molecule exhaust performance of the vacuum pump Z is impaired may occur.

Moreover, as a specific configuration for decreasing the proportion of back-flowing particles, as illustrated in FIG. 20, a configuration in which the chamfered portion MS is inclined downward in a molecule exhaust direction by machining may be considered. However, according to such a configuration, since an angle between a surface of an upper end 7A of the rotary blade 7 and a surface (a chamfered surface) of the chamfered portion MS is an acute angle, a burr is likely to occur due to machining, a machining cost increases, and the curvature of the convex circular arc surface increases due to plating and bluntness of an edge portion formed during machining. Therefore, an adverse effect occurs such that the proportion of back-flowing particles increases contrarily.

The discussion above is merely provided for general background information and is not intended to be used as an aid in determining the scope of the claimed subject matter. The claimed subject matter is not limited to implementations that solve any or all disadvantages noted in the background.

SUMMARY

The present invention has been made to solve the above-described problems, and an object thereof is to provide a vacuum pump which can effectively prevent backflow of particles from the vacuum pump to a vacuum chamber without impairing a gas molecule exhaust performance of the vacuum pump and which is ideal for preventing contamination of the inside of the vacuum chamber due to back-flowing particles, and a blade component, a rotor, and a stationary blade used in the vacuum pump.

In order to attain the object, a first aspect of the present invention provides a vacuum pump including a plurality of exhaust stages provided between an inlet port and an exhaust port so as to function as means for exhausting gas molecules, each of the plurality of exhaust stages having a structure in which the gas molecules are exhausted by a plurality of rotary blades and a plurality of stationary blades disposed at a predetermined interval in a radial form, the vacuum pump including: a number of blades provided between the inlet port and an uppermost exhaust stage of the plurality of exhaust stages so as to rotate together with the plurality of rotary blades that constitutes the uppermost exhaust stage as a particle transport stage that transports particles in an exhaust direction of the gas molecules, the number being smaller than the number of the plurality of rotary blades that constitutes the uppermost exhaust stage.

Alternatively, a particle transport stage in which particles are transported in an exhaust direction of the gas molecules is formed in the uppermost exhaust stage as a portion of the exhaust stage.

In the first aspect of the present invention, the blade that constitutes the particle transport stage may be provided adjacent to the plurality of rotary blades that constitutes the uppermost exhaust stage.

In the first aspect of the present invention, the blade that constitutes the particle transport stage may be provided integrally with an entire portion or a portion of at least one rotary blade of the plurality of rotary blades that constitutes the uppermost exhaust stage.

In the first aspect of the present invention, a height of a rotary blade adjacent to the blade that constitutes the particle transport stage among the plurality of rotary blades that constitutes the uppermost exhaust stage may be extended by the blade that constitutes the particle transport stage such that the plurality of rotary blades that constitutes the uppermost exhaust stage has an offset structure in which heights of upstream ends of the rotary blades are different.

In the first aspect of the present invention, an arrangement interval of a rotary blade of which the upstream end is raised by the offset structure and a rotary blade positioned on a front side in a rotation advancing direction of the rotary blade among the plurality of rotary blades that constitutes the uppermost exhaust stage may be larger than an arrangement interval of the other rotary blades.

In the first aspect of the present invention, a downstream end of the rotary blade positioned on the front side in the rotation advancing direction of the rotary blade of which the upstream end is raised by the offset structure among the plurality of rotary blades that constitutes the uppermost exhaust stage may recede toward the inlet port more than the downstream ends of the other rotary blades.

In the first aspect of the present invention, the downstream end of the rotary blade of which the upstream end is raised by the offset structure among the plurality of rotary blades that constitutes the uppermost exhaust stage may be extended to be longer than the downstream ends of the other rotary blades.

In the first aspect of the present invention, a height of a step associated with the offset structure may change in a form of stairs.

In the first aspect of the present invention, a height of a step associated with the offset structure may change in a tapered form.

In the first aspect of the present invention, the blade that constitutes the particle transport stage may be attached as a separate component to an entire portion or a portion of at least one rotary blade among the plurality of rotary blades that constitutes the uppermost exhaust stage.

In the first aspect of the present invention, an elevation angle of the blade that constitutes the particle transport stage may be set to be smaller than an elevation angle of the plurality of rotary blades that constitutes the uppermost exhaust stage.

In the first aspect of the present invention, the blade that constitutes the particle transport stage may be provided at a position separated from the plurality of rotary blades that constitutes the uppermost exhaust stage.

A second aspect of the present invention provides a blade component which is used in the vacuum pump according to the first aspect of the present invention and includes the blade that constitutes the particle transport stage.

A third aspect of the present invention provides a vacuum pump including a plurality of exhaust stages provided between an inlet port and an exhaust port so as to function as means for exhausting gas molecules, each of the plurality of exhaust stages having a structure in which the gas molecules are exhausted by a plurality of rotary blades and a plurality of stationary blades disposed at a predetermined interval in a radial form, wherein heights of upstream ends of at least some of the plurality of rotary blades that constitutes the uppermost exhaust stage are lowered such that an offset structure in which the heights of the upstream ends are different is achieved and a particle transport stage in which particles are moved in an exhaust direction of the gas molecules is achieved.

In the third aspect of the present invention, a height of a step associated with the offset structure may change in a form of stairs.

In the third aspect of the present invention, a height of a step associated with the offset structure may change in a tapered form.

A fourth aspect of the present invention provides a rotor which is used in the vacuum pump according to the first or third aspect of the present invention and includes the blade that constitutes the particle transport stage.

In the first or third aspect of the present invention, a stationary blade inclined at the same angle as but in the opposite direction to the plurality of rotary blades that constitutes the uppermost exhaust stage may be provided on an upstream side of the uppermost exhaust stage as a reflecting means.

A fifth aspect of the present invention provides a stationary blade which is used in the vacuum pump according to the first or third aspect of the present invention and is the stationary blade provided on an upstream side of the uppermost exhaust stage as the reflecting means so as to be inclined at the same angle as but in the opposite direction to the plurality of rotary blades that constitutes the uppermost exhaust stage.

As described above, the present invention employs a configuration in which a number of blades that rotate together with the rotary blade that constitutes the uppermost exhaust stage, the number being smaller than the number of rotary blades that form the uppermost exhaust stage is provided as the particle transport stage that transports particles in an exhaust direction of the gas molecules or a configuration in which a blade provided integrally with the rotary blade that constitutes the uppermost exhaust stage is included. Therefore, a vacuum pump which can effectively prevent backflow of particles from the vacuum pump to a vacuum chamber without impairing a gas molecule exhaust performance of the vacuum pump and which is ideal for preventing contamination of the inside of the vacuum chamber due to back-flowing particles, and a blade component and a rotor used in the vacuum pump can be provided.

The particle transport stage can improve an exhaust performance better than a conventional exhaust stage structure regardless of whether the particle transport stage is provided separately from the exhaust stage or is integrated with the exhaust stage.

The reasons therefor are described in "Reason 1" and "Reason 2" below.

Reason 1

In the present invention, the particle transport stage can exhaust gas molecules efficiently using a plurality of exhaust stages designed so that conditions ideal for exhausting gas molecules are established without such a design change as to decrease a molecule exhaust performance of the exhaust stage such as, for example, increasing an arrangement interval of rotary blades that form an uppermost exhaust stage as means for efficiently exhausting particles falling from the inlet port.

Reason 2

In the present invention, since the number of blades that form the particle transport stage is smaller than the number of rotary blades that form the uppermost exhaust stage, the arrangement interval of the blades that form the particle transport stage is larger than the arrangement interval of the rotary blades that form the uppermost exhaust stage. Therefore, when a collidable region (=(blade arrangement interval)×(particle falling velocity)/(blade rotation velocity)) of particles in the particle transport stage is compared with a collidable region (=(rotary blade arrangement interval)×(particle falling velocity)/(rotary blade rotation velocity)) of particles in the uppermost exhaust stage, the former particle collidable region (that is, the particle collidable region in the particle transport stage) is the larger. When the particle transport stage and the exhaust stage are compared, in the particle transport stage, the proportion of particles (that is, exhaust direction reflecting particles) reflected in an exhaust direction (specifically, in the direction toward the exhaust stage) due to collision with the blade is high, and the proportion of particles (that is, back-flowing particles) rebounding in the direction toward the inlet port due to collision with the blade decreases. This is because, if the collidable region of particles broadens, the probability that particles collide with an inclined surface inclined in the gas molecule exhaust direction, of the rotary blade or the blade and are reflected in the gas molecule exhaust direction is higher than the probability that particles collide with a surface (specifically, the chamfered surface and the convex circular arc surface positioned in an upper portion of the chamfered portion) where particles are highly likely to flow back toward the inlet port.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DESCRIPTION OF THE PREFERRED EMBODIMENTS

Hereinafter, preferred embodiments for implementing the present invention will be described in detail with reference to the accompanying drawings. In the present embodiment, a so-called composite blade-type turbo-molecular pump which includes a turbo-molecular pump unit including a plurality of exhaust stages and a thread groove exhaust stage as an exhaust means will be described as an example of a vacuum pump. The present embodiment may be applied to a pump which includes a turbo-molecular pump unit only.

Figure 1:
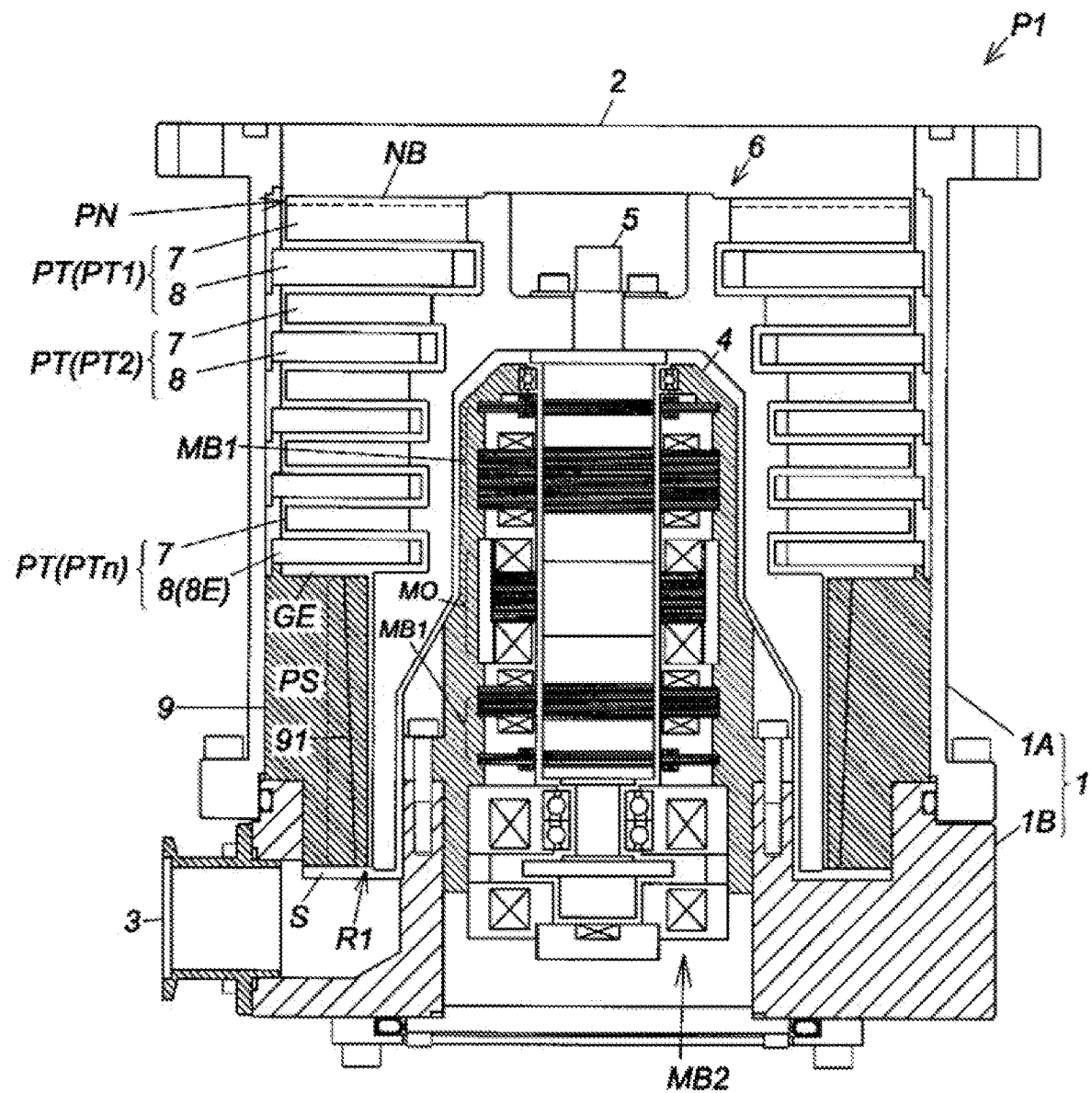
FIG. 1 is a cross-sectional view of a vacuum pump to which the present invention is applied.

FIG. 1 is a cross-sectional view of a vacuum pump to which the present invention is applied.

Referring to FIG. 1, a vacuum pump P1 includes an outer case 1 having a cylindrical cross-sectional shape, a rotor 6 disposed inside the outer case 1, a supporting means that rotatably supporting the rotor 6, and a driving means that rotates the rotor 6.

The outer case 1 has a bottomed cylindrical shape in which a cylindrical pump case 1A and a bottomed cylindrical pump base 1B are integrally connected by a fastening bolt in an axial direction thereof. An upper end side of the pump case 1A is open as an inlet port 2 for sucking gas therein, and an exhaust port 3 for exhausting gas outside the outer case 1 is formed in a lateral surface of a lower end of the pump base 1B.

The inlet port 2 is connected to a vacuum chamber CH (see FIG. 18) which is high vacuum similarly to a process chamber of a semiconductor manufacturing apparatus with a pressure adjustment valve BL (see FIG. 18) disposed therebetween. The exhaust port 3 communicates with an auxiliary pump (not illustrated).

A cylindrical stator column 4 in which various electrical components are enclosed is provided in a central portion of the pump case 1A. In the vacuum pump P1 illustrated in FIG. 1, the stator column 4 is provided on the pump base 1B by forming the stator column 4 as a separate component from the pump base 1B and fixing the same by screw-fastening to an inner bottom of the pump base 1B. However, as another embodiment, the stator column 4 may be integrally provided on the inner bottom of the pump base 1B.

The rotor 6 is provided on an outer side of the stator column 4. The rotor 6 is enclosed in the pump case 1A and the pump base 1B and has a cylindrical shape that surrounds an outer periphery of the stator column 4.

A rotor shaft 5 is provided on an inner side of the stator column 4. The rotor shaft 5 is disposed so that an upper end thereof faces the inlet port 2 and a lower end thereof faces the pump base 1B. Moreover, the rotor shaft 5 is rotatably supported by a magnetic bearing (specifically, two sets of known radial magnetic bearings MB1 and one set of known axial magnetic bearings MB2). Furthermore, a driving motor MO is provided on an inner side of the stator column 4, and the rotor shaft 5 is rotated about its shaft center by the driving motor MO.

An upper end of the rotor shaft 5 protrudes upward from an upper end surface of a cylinder of the stator column 4, and the protruding upper end of the rotor 6 is integrally fixed to an upper end of the rotor shaft 5 by fastening means such as a bolt. Therefore, the rotor 6 is rotatably supported by the magnetic bearing (the radial magnetic bearing MB1 and the axial magnetic bearing MB2) with the rotor shaft 5 disposed therebetween, and the rotor 6 can rotate about the shaft center integrally with the rotor shaft 5 when the driving motor MO is activated in the supporting state. That is, in the vacuum pump P1 illustrated in FIG. 1, the rotor shaft 5 and the magnetic bearing function as a supporting means that rotatably supports the rotor 6, and the driving motor MO functions as a driving means that rotates the rotor 6.

The vacuum pump P1 illustrated in FIG. 1 includes a plurality of exhaust stages PT provided between the inlet port 2 and the exhaust port 3 so as to function as means for exhausting gas molecules.

Moreover, in the vacuum pump P1 illustrated in FIG. 1, a thread groove pump stage PS is provided in a downstream portion of the plurality of exhaust stages PT (specifically, between the exhaust port 3 and a lowermost exhaust stage PT (PTn) of the plurality of exhaust stages PT).

Furthermore, in the vacuum pump P1 illustrated in FIG. 1, a particle transport stage PN that transports particles in an exhaust direction of gas molecules is provided in an upstream portion of the plurality of exhaust stages PT (specifically, between the inlet port 2 and an uppermost exhaust stage PT (PT1) of the plurality of exhaust stages PT). The uppermost exhaust stage PT (PT1) and the particle transport stage PN may be provided integrally.

Details of Exhaust Stage

In the vacuum pump P1 illustrated in FIG. 1, a portion located closer to the upstream side than an approximately middle portion of the rotor 6 functions as the plurality of exhaust stages PT. Hereinafter, the plurality of exhaust stages PT will be described in detail.

A plurality of rotary blades 7 that rotates integrally with the rotor 6 is provided on the outer peripheral surface of the rotor 6 on a side closer to the upstream side than an approximately middle portion of the rotor 6, and the rotary blades 7 are arranged at a predetermined interval in a radial form about a central axis of rotation of the rotor 6 (specifically, the shaft center of the rotor shaft 5) or a shaft center of the outer case 1 (hereinafter referred to as "a vacuum pump shaft center") in respective exhaust stages PT (PT1, PT2, . . . and PTn).

On the other hand, a plurality of stationary blades 8 is provided on an inner periphery side of the pump case 1A, and the stationary blades 8 are arranged at a predetermined interval in a radial form about the vacuum pump shaft center in respective exhaust stages PT (PT1, PT2, . . . , and PTn) similarly to the rotary blades 7.

That is, the exhaust stages PT (PT1, PT2, ..., and PTn) of the vacuum pump P1 illustrated in FIG. 1 are provided in multiple stages between the inlet port 2 and the exhaust port 3 and include the plurality of rotary blades 7 and the plurality of stationary blades 8 arranged at a predetermined interval in a radial form in respective exhaust stages PT (PT1, PT2, ..., and PTn), and gas molecules are exhausted by these blades.

All the rotary blades 7 are blade-shaped cut components formed by cutting integrally with an outer diameter machining portion of the rotor 6 and are inclined at an angle optimal for exhausting gas molecules. Moreover, all the stationary blades 8 are inclined at an angle optimal for exhausting gas molecules.

Description Exhausting Operation of Plurality of Exhaust Stages

In the uppermost exhaust stage PT (PT1) of the plurality of exhaust stages PT having the above-described configuration, the plurality of rotary blades 7 rotates at a high speed integrally with the rotor shaft 5 and the rotor 6 according to activation of the driving motor MO, and a momentum in a downward direction or a tangential direction is applied to gas molecules entering from the inlet port 2 by a front surface in a rotation direction of the rotary blade 7 or an inclined surface facing downward (a direction from the inlet port 2 toward the exhaust port 3, hereinafter referred to as downward). The gas molecules having the momentum in the downward direction are transported to the next exhaust stage PT (PT2) by an inclined surface facing downward in a direction reverse to a rotation direction of the rotary blade 7 provided in the stationary blade 8. Moreover, in the next exhaust stage PT (PT2) and its subsequent exhaust stage PT, the rotary blade 7 rotates and application of a momentum to the gas molecules by the rotary blade 7 and a gas molecule transporting operation of the stationary blade 8 are performed similarly to the uppermost exhaust stage PT (PT1), whereby the gas molecules near the inlet port 2 are exhausted so as to move sequentially toward the downstream side of the rotor 6.

Details of Thread Groove Pump Stage

In the vacuum pump P1 illustrated in FIG. 1, a portion located closer to the downstream side than an approximately middle portion of the rotor 6 functions as the thread groove pump stage PS. Hereinafter, the thread groove pump stage PS will be described in detail.

The thread groove pump stage PS has a thread groove exhaust portion stator 9 as means for forming a thread groove exhaust passage R on an outer peripheral side (specifically, an outer peripheral side of a portion of the rotor 6 located closer to the downstream side than an approximately middle portion of the rotor 6) of the rotor 6, and the thread groove exhaust portion stator 9 is provided on an inner peripheral side of the outer case 1 as a stator member.

The thread groove exhaust portion stator 9 is a cylindrical stator member disposed so that an inner peripheral surface thereof opposes the outer peripheral surface of the rotor 6 and is disposed so as to surround a portion of the rotor 6 located closer to the downstream side than an approximately middle portion of the rotor 6.

The portion of the rotor 6 located closer to the downstream side than the approximately middle portion of the rotor 6 is a portion that rotates as a rotary member of the thread groove exhaust portion PS and is inserted and accommodated inside the thread groove exhaust portion stator 9 with a predetermined gap therebetween.

A thread groove 91 of which the depth changes in a tapered cone shape of which the diameter decreases as it advances downward is formed in an inner peripheral portion of the thread groove exhaust portion stator 9. The thread groove 91 formed in a spiral form so as to extend from an upper end of the thread groove exhaust portion stator 9 to a lower end.

The thread groove exhaust portion stator 9 having the thread groove 91 forms a thread groove exhaust passage R for exhausting gas on an outer peripheral side of the rotor 6. Although not illustrated in the drawings, the thread groove exhaust passage R may be formed by forming the thread groove 91 described earlier in the outer peripheral surface of the rotor 6.

In the thread groove exhaust portion PS, since gas is transported while being compressed by a drag effect of the outer peripheral surface of the rotor 6 and the thread groove 91, the depth of the thread groove 91 is set to be the largest on an upstream inlet side (a passage opening end close to the inlet port 2) of the thread groove exhaust passage R and be the smallest on a downstream outlet side (a passage opening end close to the exhaust port 3).

An inlet (an upstream opening end) of the thread groove exhaust passage R is open toward a gap (hereinafter referred to as a "final gap GE") between the thread groove exhaust portion stator 9 and a stationary blade 8E that form the lowermost exhaust stage PTn, and an outlet (a downstream opening end) of the thread groove exhaust passage R communicates with the exhaust port 3 through an intra-pump exhaust port-side passage S.

The intra-pump exhaust port-side passage S is formed so as to extend from an outlet of the thread groove exhaust passage R to the exhaust port 3 by forming a predetermined gap (in the vacuum pump P1 illustrated in FIG. 1, a gap that circles a lower outer periphery of the stator column 4) between a lower end of the thread groove exhaust portion stator 9 or the rotor 6 and an inner bottom of the pump base 1B.

Description of Exhausting Operation of Thread Groove Exhaust Portion

The gas molecules having reached the final gap GE by the transport by the exhausting operation of the plurality of exhaust stages PT moves toward the thread groove exhaust passage R. The moved gas molecules move toward the intra-pump exhaust port-side passage S while being compressed from a transitional flow to a viscous flow by a drag effect generated by rotation of the rotor 6. The gas molecules having reached the intra-pump exhaust port-side passage S flow into the exhaust port 3 and are exhausted outside the outer case 1 through an auxiliary pump (not illustrated).

Details of Particle Transport Stage

Figure 2:
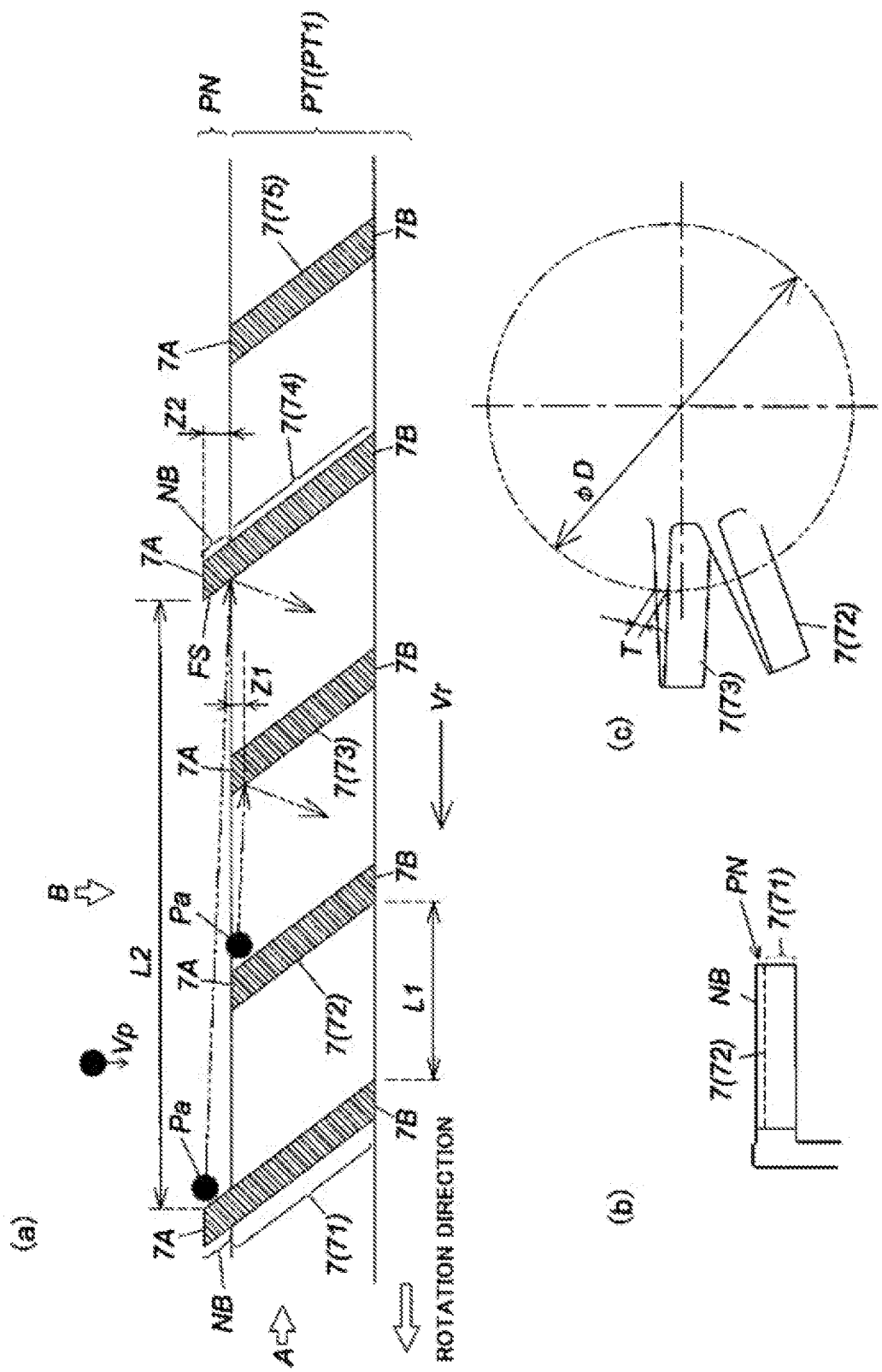
FIG. 2A is an explanatory diagram of a state when a particle transport stage of the vacuum pump illustrated in FIG. 1 is seen from an outer peripheral surface side of a rotor.
FIG. 2B is a perspective view along arrow A in FIG. 2A.
FIG. 2C is a perspective view along arrow B in FIG. 2A.

FIG. 2A is an explanatory diagram of a state when a particle transport stage of the vacuum pump illustrated in FIG. 1 is seen from an outer peripheral surface of the rotor, FIG. 2B is a perspective view along arrow A in FIG. 2A, and FIG. 2C is a perspective view along arrow B in FIG. 2A.

Referring to FIG. 2A, the particle transport stage PN of the vacuum pump P1 illustrated in FIG. 1 has a structure in which the particle transport stage PN rotates together with the rotary blades 7 that form the uppermost exhaust stage PT (PT1) and has a fewer number of blades NB than the number of rotary blades 7 that form the uppermost exhaust stage PT (PT1).

Since the number of rotary blades 7 that form the particle transport stage PN is smaller than the number of rotary blades 7 that form the uppermost exhaust stage PT (PT1) as described above, an arrangement interval L2 of the rotary blades 7 that form the particle transport stage PN is set to be larger than an arrangement interval L of the rotary blades 7 that form the uppermost exhaust stage PT (PT1) (L<L2).

In the vacuum pump P1 illustrated in FIG. 1, as a specific configuration of the blade NB that constitutes the particle transport stage PN, the blade NB is provided adjacent to the rotary blade 7 that form the uppermost exhaust stage PT (PT1) as illustrated in FIG. 2A.

Due to such an adjacent structure as described above, in the vacuum pump P1 illustrated in FIG. 1, the height of the rotary blade 7 (71, 74) adjacent to the blade NB that constitutes the particle transport stage PN among the rotary blades 7 that form the uppermost exhaust stage PT (PT1) is extended by the blade NB that form the particle transport stage PN. Due to this, the plurality of rotary blades 7 that constitutes the uppermost exhaust stage PT (PT1) has an offset structure in which the heights of the upstream ends 7A thereof are different.

As a specific configuration example of the adjacent structure, the vacuum pump P1 illustrated in FIG. 1 employs a structure in which the blade NB and the rotary blade 7 are provided integrally as a single component as illustrated in FIG. 2A.

That is, the vacuum pump P1 illustrated in FIG. 1 employs a structure (hereinafter referred to as a "blade integrated structure") in which the blade NB that constitutes the particle transport stage PN is provided integrally with an entire portion (specifically, an entire portion in a diameter D direction and a thickness T direction of the rotary blade 7) of at least one rotary blade 7, 7 . . . (71, 74) of the plurality of rotary blades 7 that form the uppermost exhaust stage PT (PT1) as illustrated in FIG. 2A.

Although the example of FIG. 2A illustrates a configuration in which, due to the blade integrated structure, the upstream ends 7A of two rotary blades 71 and 74 positioned on both sides of two rotary blades 72 and 73 are higher than the upstream ends 7A of the other rotary blades 72, 73, and 75, there is no limitation thereto. The number of rotary blades 72 and 73 positioned between the rotary blades 71 and 74 having the higher upstream ends 7A may be appropriately changed as necessary.

Description of Operation of Particle Transport Stage

Figure 18:
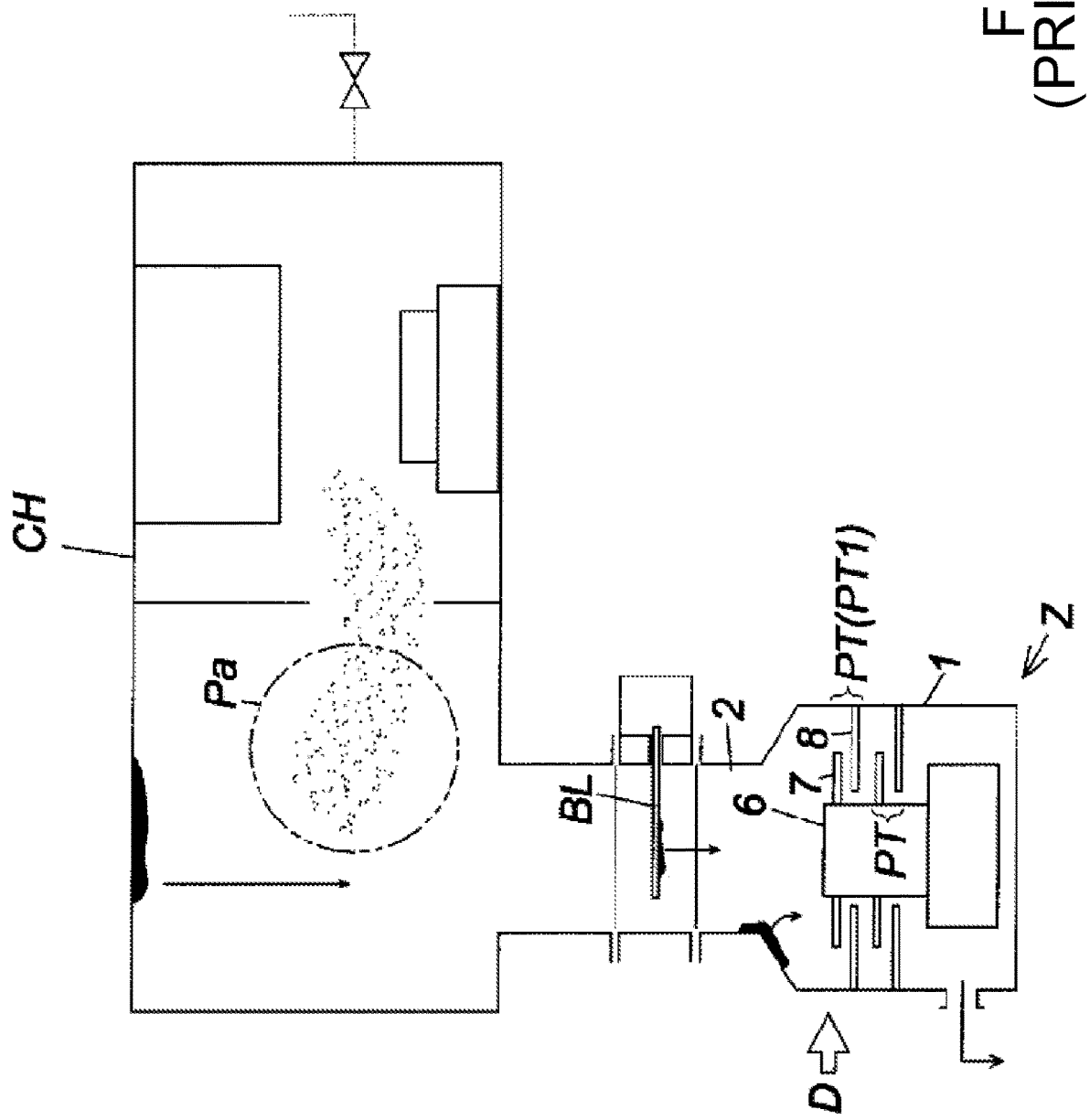
FIG. 18 is a schematic diagram of an exhaust system which employs a conventional vacuum pump as a gas exhaust means of a vacuum chamber.
Figure 19:
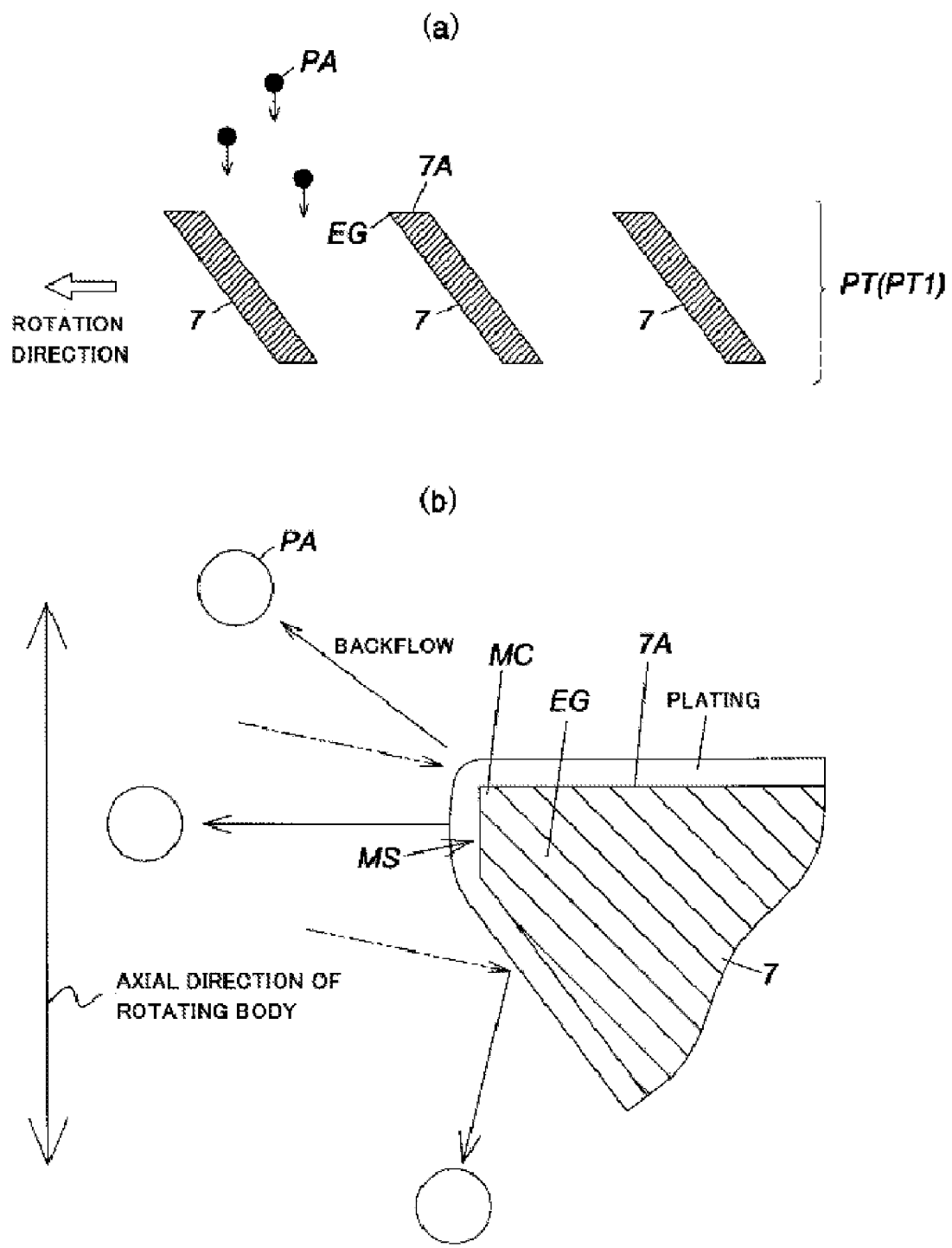
FIG. 19A is a schematic diagram of a state in which a rotary blade of an uppermost exhaust stage of the conventional vacuum pump illustrated in FIG. 18 is seen from a direction indicated by arrow D in FIG. 18
FIG. 19B is an enlarged view of a blade edge positioned on an upper end surface side of the rotary blade illustrated in FIG. 19A.
Figure 20:
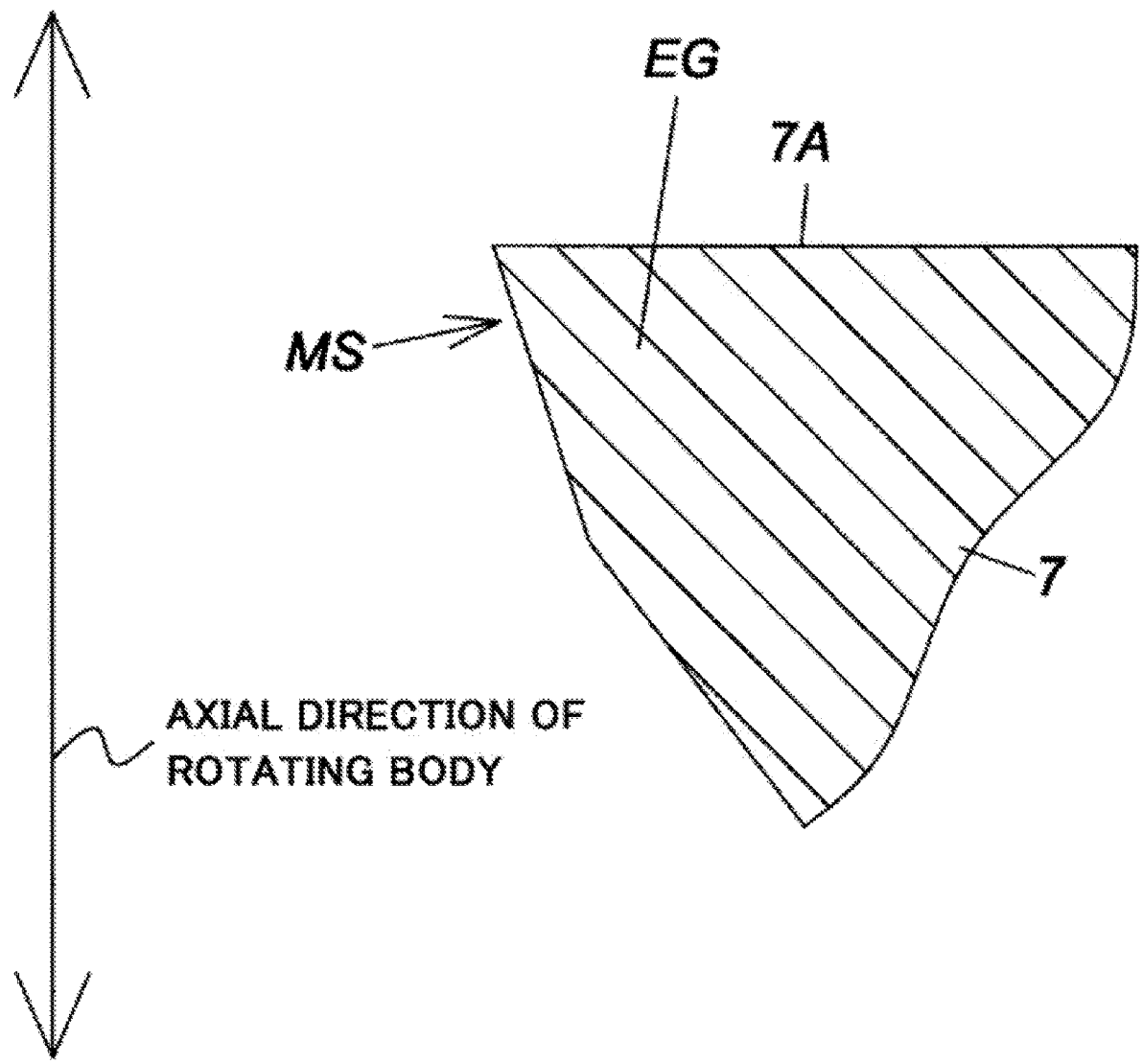
FIG. 20 is an explanatory diagram illustrating a state in which a chamfered portion is inclined downward in a molecule exhaust direction by machining.

Referring to FIG. 18, it is assumed that fine particulate process byproducts generated secondarily due to the chemical process in the vacuum chamber CH float and spread in the vacuum chamber CH and fall toward the inlet port 2 of the vacuum pump P1 by the weight thereof or a transport effect of gas molecules. It is also assumed that deposits attached and deposited to an inner wall surface of the vacuum chamber CH and deposits attached and deposited to a pressure adjustment valve BL peel off due to vibration or the like and fall toward the inlet port 2 of the vacuum pump P1.

Referring to FIG. 2A, the particles Pa having reached the inlet port 2 due to the falling fall further from the inlet port 2 and enter first the particle transport stage PN. The entering particles Pa collide with the blade NB that constitutes the particle transport stage PN.

In this case, in the particle transport stage PN, the proportion of particles (hereinafter referred to as "exhaust direction reflecting particles") reflected in a gas molecule exhaust direction by colliding with an inclined surface FS (hereinafter, referred to as a "front inclined surface FS of the blade NB") of the blade NB photosensitive drum on a front side in an advancing direction with rotation of the blade NB among a plurality of particles colliding with the blade NB increases whereas the proportion of particles (hereinafter referred to as "back-flowing particles") rebounding toward the inlet port 2 decreases. The reason will be described in "Study 1" and "Study 2" below.

Study 1

In "Study 1", a structure example in which the blade NB that constitutes the particle transport stage PN is provided adjacent to the rotary blade 7 that constitutes the uppermost exhaust stage PT (PT1) will be discussed.

When the particle transport stage PN is not provided in the vacuum pump P1 illustrated in FIG. 1 (corresponding to the conventional vacuum pump), a collidable region Z1 (see FIG. 2A) of particles in the uppermost exhaust stage PT (PT1) is specified on the basis of Equation (1) below.

On the other hand, when the particle transport stage PN is provided in the vacuum pump P1 illustrated in FIG. 1 (corresponding to the vacuum pump of the present invention), a collidable region Z2 (see FIG. 2A) of particles in the particle transport stage PN is specified on the basis of Equation (2) below.

$$Z1 = L1 \times Vp/Vr \tag{1}$$

$$Z2 = L2 \times Vp/Vr \tag{2}$$

L1: Arrangement interval of rotary blades 7
L2: Arrangement interval of blades NB
Vp: Falling velocity of particle Pa
Vr Rotation velocity (peripheral velocity) of rotary blade 7 and blade NB In the vacuum pump P1 illustrated in FIG. 1, since the number of blades NB that form the particle transport stage PN is smaller than the number of rotary blades 7 that form the uppermost exhaust stage PT1, the arrangement interval L2 of the blades NB that form the particle transport stage PN is set to be wider than the arrangement interval L1 of the rotary blades 7 that form the uppermost exhaust stage PT1.

When Equations (1) and (2) are compared with the above fact into consideration, since Z2 is larger than Z1 (Z2>Z1), the proportion of the exhaust direction reflecting particles in the particle transport stage PN increases whereas the proportion of the back-flowing particles decreases. This is because, if the collidable region of particles broadens, the probability that particles collide with an inclined surface inclined in the gas molecule exhaust direction, of the rotary blade 7 or the blade NB and are reflected in the gas molecule exhaust direction is higher than the probability that particles collide with a surface (specifically, the chamfered surface and the convex circular are surface positioned in an upper portion of the chamfered portion) where particles are highly likely to flow back toward the inlet port 2.

Study 2

Figure 3:
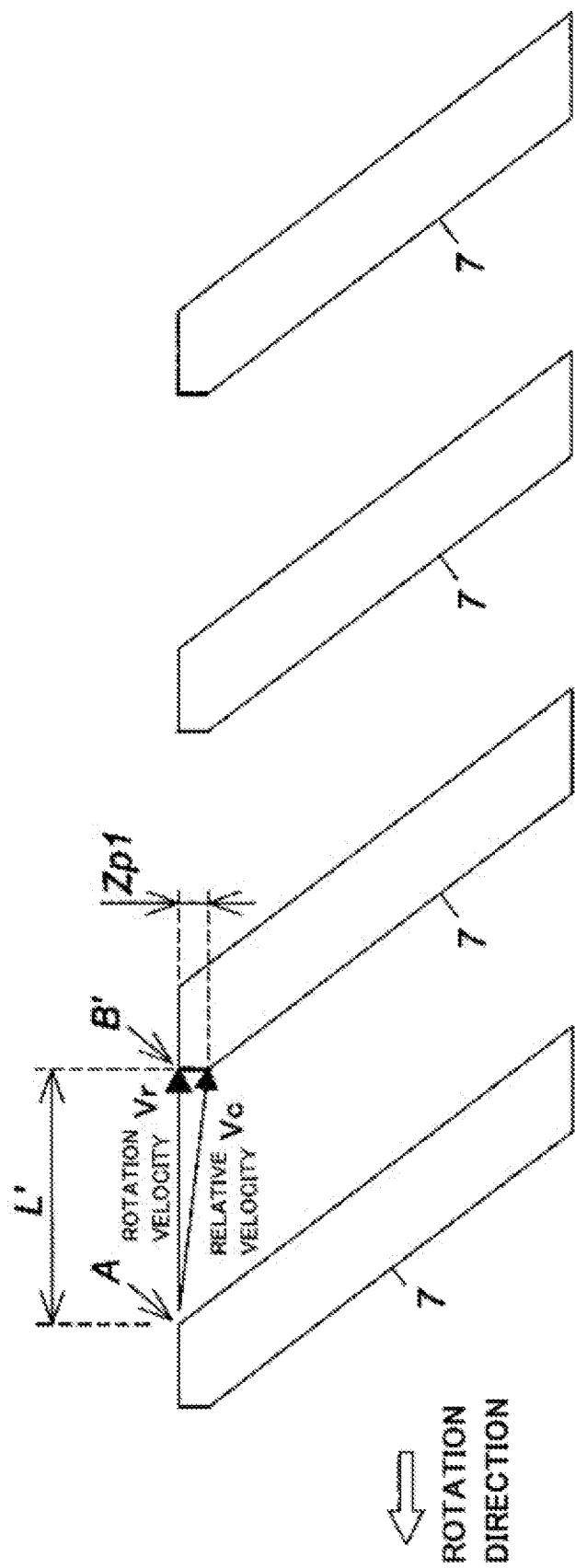
FIG. 3 is an explanatory diagram of a collidable region of falling particles in a vacuum pump (corresponding to a conventional vacuum pump) which does not include a particle transport stage.
Figure 4:
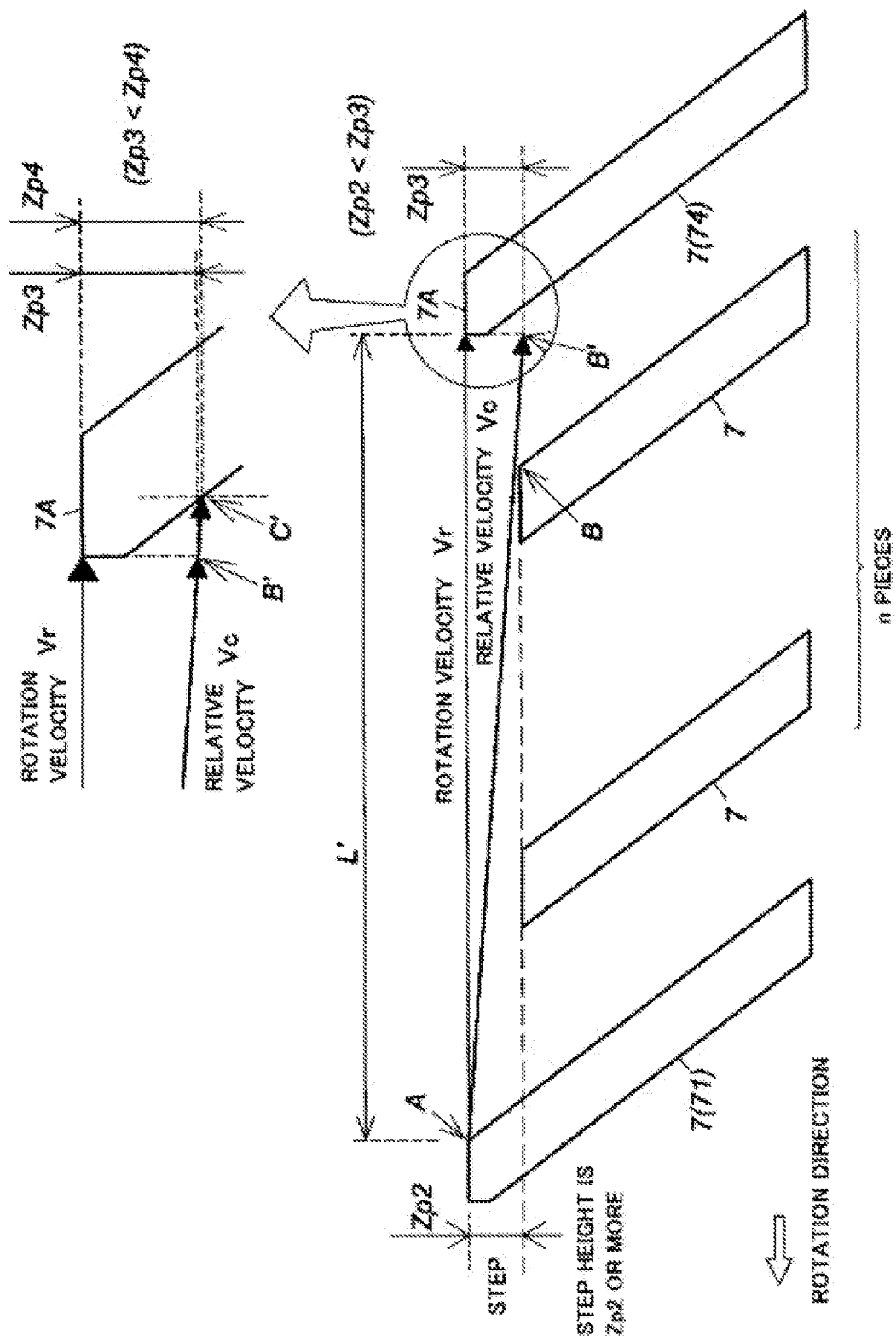
FIG. 4 is an explanatory diagram of a collidable region of falling particles in the vacuum pump (corresponding to a vacuum pump of the present invention) illustrated in FIG. 1 which includes a particle transport stage.

FIG. 3 is an explanatory diagram of a collidable region of falling particles in a vacuum pump (corresponding to a conventional vacuum pump) which does not include a particle transport stage and FIG. 4 is an explanatory diagram of a collidable region of falling particles in the vacuum pump (corresponding to the vacuum pump of the present invention) illustrated in FIG. 1 which includes a particle transport stage.

In "Study 2", the offset structure will be discussed.

Referring to FIG. 3, a collidable region Zp1 of particles in a diameter D portion (see FIG. 2C) of the uppermost exhaust stage P (PT1) of a vacuum pump (corresponding to the conventional vacuum pump) which does not have the offset structure (that is, in which the particle transport stage PN is not provided) is specified by Equation (3) below.

$$Zp1 = \{(\pi D/N - T)Vp\}/(Vr) \tag{3}$$

N: Number of rotary blades 7 that form uppermost exhaust stage
D: Dimension of diameter D portion (see FIG. 2C)
T: Vertical thickness of diameter D portion of rotary blade 7 that constitutes uppermost exhaust stage (see FIG. 2C)
Vp: Falling velocity of particle
Vr: Rotation velocity (peripheral velocity) of diameter D portion of rotary blade 7

Referring to FIG. 4, a height (protruding height) Zp2 of a step of the offset structure is specified on the basis of Equation (4) below.

Equation (4) is obtained for an offset structure in which two rotary blades 72 and 73 in FIG. 2A are regarded as n rotary blades 7 as illustrated in FIG. 3, and the upstream ends 7A of the rotary blades 71 and 74 positioned on both sides of the n rotary blades 7, 7 . . . are higher than the upstream ends of the other rotary blades (other than 71 and 74).

$$Zp2=\{(\pi D \cdot n/N)Vp\}/(Vr) \quad (4)$$

n: Number of rotary blades positioned between rotary blades 71 and 74 having higher upstream ends
D: Dimension of diameter D portion (see FIG. 2C)
N: Number of rotary blades 7 that form uppermost exhaust stage
Vp: Falling velocity of particle Pa
Vr: Rotation velocity (peripheral velocity) of diameter D portion of rotary blade 7

In the diameter D portion in FIG. 2C, when a step between the n rotary blades 7 and the rotary blades 7 (71, 74) positioned on both sides thereof is set to be equal to or larger than Zp2 as illustrated in FIG. 4, particles falling in a space (corresponding to L2 in FIGS. 2A to 2C) between the rotary blades 71 and 74 collide with a front surface of the rotary blade 74 without colliding with the n rotary blades 7. A collidable region Zp3 of particles with respect to a front surface of the rotary blade 74 is specified by Equation (5) below.

In the vacuum pump (corresponding to the vacuum pump of the present invention) illustrated in FIG. 1, including the offset structure (that is, the particle transport stage PN), the plurality of rotary blades 7 that constitutes the uppermost exhaust stage PT (PT1) has an offset structure in which the upstream ends 7A thereof are different. As described above, since this offset structure results from the fact that the height of the rotary blade 7 adjacent to the blade NB that constitutes the particle transport stage PN is extended by the blade NB, it is thought in "Study 2" that "there is a rotary blade of which the upstream end is higher by the height Zp2 of the blade NB".

In this case, the collidable region Zp3 (see FIG. 4) of particles in the diameter D portion (see FIG. 2C) of the uppermost exhaust stage PT (PT1) is specified on the basis of Equation (5) below.

$$Zp3=[\{\pi D(n+1)/N-T\}Vp]/(Vr) \quad (5)$$

N: Number of rotary blades 7 that form uppermost exhaust stage
D: Dimension of diameter D portion (see FIG. 2C)
T: Vertical thickness of diameter D portion of rotary blade 7 that form uppermost exhaust stage (see FIG. 2C)
Vp: Falling velocity of particle
Vr: Rotation velocity (peripheral velocity) of diameter D portion of rotary blade 7
n: Number of rotary blades positioned between rotary blades 71 and 74 having higher upstream ends Referring to FIG. 4, a relative velocity Vc of particles when seen from the rotary blade 7 is calculated from a falling velocity Vp of particles and a rotation velocity Vr of the rotary blade 7 in the diameter D portion (see FIGS. 2A to 2C). In FIG. 4, when the interval of the rotary blades 7 (71, 74) is a blade interval L', particles (particles which can enter (fall) up to the most downstream side within the blade interval L') entering from a position A in FIG. 4 fall up to a position B' positioned on an extension line of a distal end of the rotary blade 7 (74) within the range of the blade interval L'. A falling distance from the upper end surface 7A of the rotary blade 7 (74) to the position B' is Zp3 calculated by Equation (5). In the vacuum pump (corresponding to the vacuum pump of the present invention) illustrated in FIG. 1, including the particle transport stage PN, since a blade surface such as a chamfered portion is not present in the range of Zp3, particles falling up to the position B' can fall further, and finally, collide with a front surface of the rotary blade 7 (74) (specifically, a position C' on a downward inclined surface of the rotary blade 7 (74)).

As can be understood from the above description, in the vacuum pump (corresponding to the vacuum pump of the present invention) illustrated in FIG. 1, including the particle transport stage PN, the falling distance Zp4 of particles from the upper end surface 7A of the rotary blade 7 (74) to the position C' is a collidable region of the particles, and the collidable region (the falling distance Zp4) is larger than the collidable region Zp3 obtained from Equation (5).

In short, although particles entering from the position A in FIG. 4 collide with the point B if the height of a step associated with the offset structure is Zp2, the particles do not collide with the n rotary blades 7 but collide with a front surface of the rotary blade 7 (74) (for example, the position C' on a downward inclined surface of the rotary blade 7 (74)) if the step is equal to or larger than Zp2.

Here. Equations (3) and (5) will be compared. In this case, for simplicity, if the thickness T of the rotary blade 7 in Equations (3) and (5) is ignored, since the collidable region of particles Pa is enlarged by (n+1) times when the offset structure in which the step height is equal to or larger than Zp2 (that is, the case of Equation (5)) as compared to the case of Equation (3), the proportion of the exhaust direction reflecting particles increases and the proportion of the backflowing particles decreases. This is because, if the collidable region of particles broadens, the probability that particles collide with an inclined surface inclined in the gas molecule exhaust direction, of the rotary blade 7 or the blade NB and are reflected in the gas molecule exhaust direction is higher than the probability that particles collide with a surface (specifically, the chamfered surface described in the conventional art and the convex circular arc surface positioned in an upper portion of the chamfered portion) where particles are highly likely to flow back toward the inlet port 2.

The same operation is applied to a structure in which the blade NB and the rotary blade 7 are provided separately.

Another Embodiment (Example 1) of Particle Transport Stage PN

Figure 5:
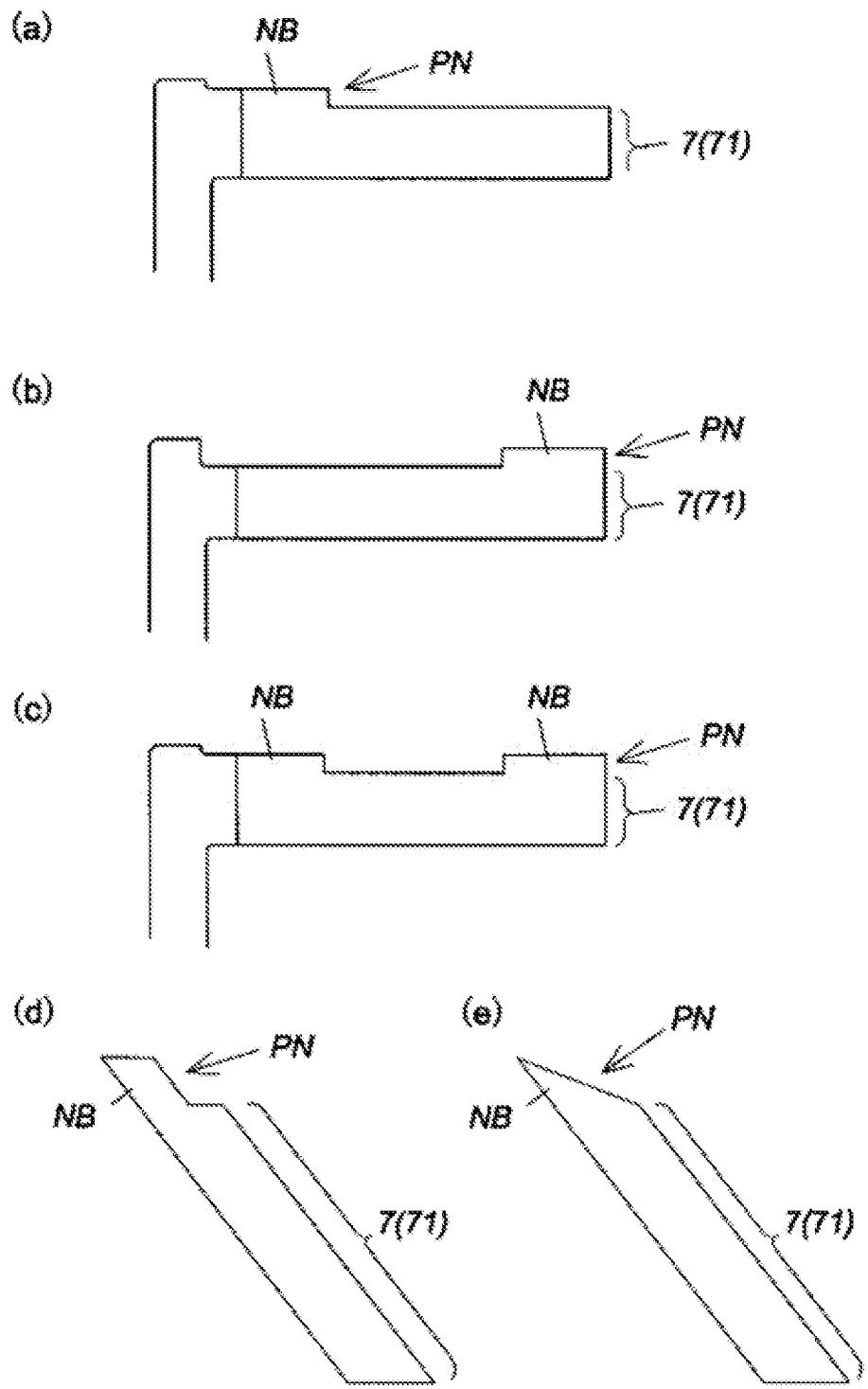
FIGS. 5A, 5B, 5C, 5D, and 5E are explanatory diagrams of another embodiment (Example 1) of the particle transport stage.

Although the vacuum pump P1 illustrated in FIG. 1 employs a configuration in which the blade NB is provided in an entire portion of the rotary blade 7 as a specific configuration of the particle transport stage PN, there is no limitation thereto. For example, a configuration in which the blade NB is provided in a portion in a length L direction of the rotary blade 7 as illustrated in FIGS. 5A, 5B, and 5C and a configuration in which the blade NB is provided in a portion of a thickness T direction of the rotary blade 7 as illustrated in FIGS. 5D and 5E may be employed. With such a configuration, the above-described effects (an increase in the proportion of exhaust direction reflecting particles and a decrease in the proportion of back-flowing particles) are obtained.

Another Embodiment (Example 2) of Particle Transport Stage PN

Although the vacuum pump illustrated in FIG. 1 is configured such that the intervals of the plurality of rotary blades 7 are the same as a specific configuration of the plurality of rotary blades 7 that constitutes the uppermost exhaust stage PT (PT1) as illustrated in FIG. 2A, there is no limitation thereto. For example, as illustrated in FIG. 6, an arrangement interval of the rotary blade 7 (74) of which the upstream end is raised by the offset structure and the rotary blade 73 (hereinafter referred to as a "preceding blade 7 (73)") positioned on a front side in a rotation advancing direction of the rotary blade 7 (74) may be set to be larger than the arrangement interval of the other rotary blades 7.

Figure 6:
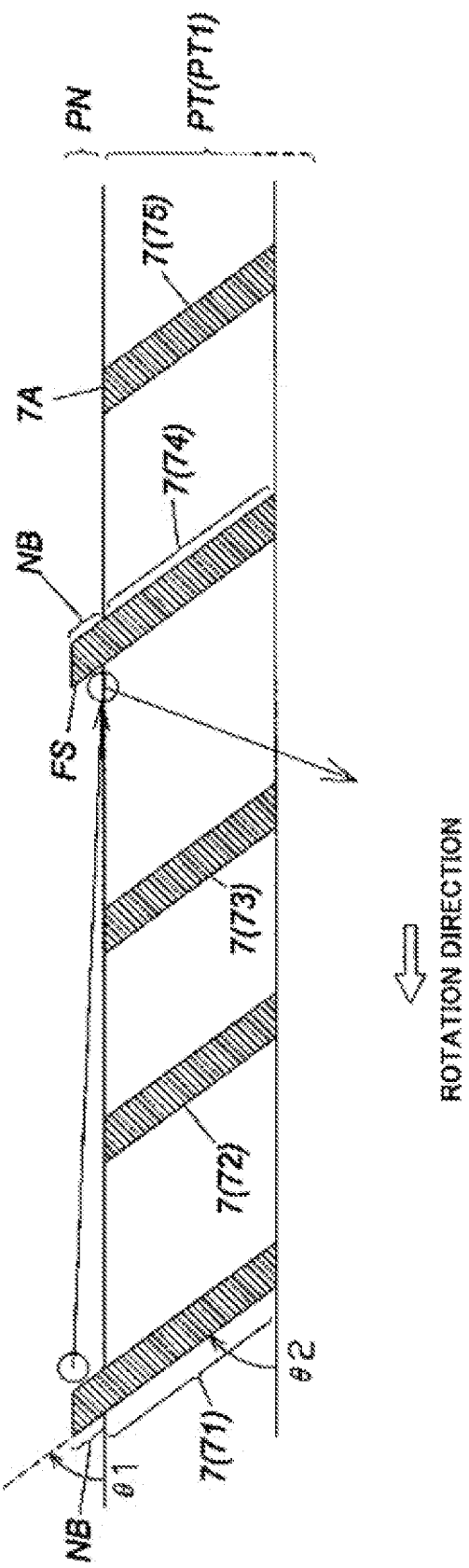
FIG. 6 is an explanatory diagram of another embodiment (Example 2) of the particle transport stage.

Referring to FIG. 6, when the setting of the arrangement intervals is employed, exhaust direction reflecting particles reflected by colliding with the front inclined surface FS of the blade NB rarely collide with the preceding blade 7 (73), the number of particles (one kind of back-flowing particles) rebounding toward the inlet port 2 by being reflected due to collision with the rear surface (an inclined surface facing the inlet port 2 on a rear side in the rotation direction, the same hereinbelow) of the preceding blade 7 (73) decreases, and a particle exhaust efficiency is improved further.

Another Embodiment (Example 3) of Particle Transport Stage PN

Figure 7:
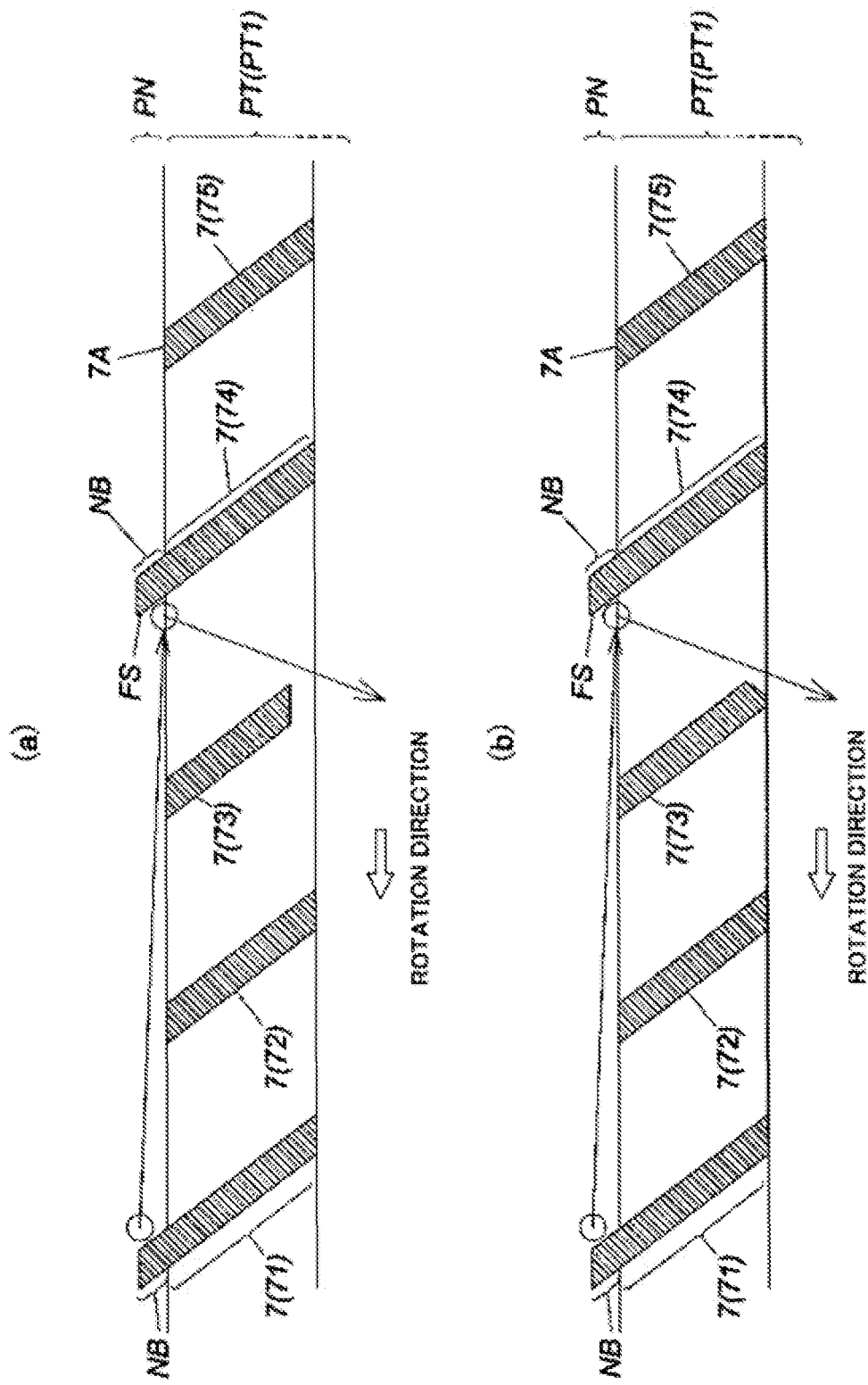
FIGS. 7A and 7B are explanatory diagrams of another embodiment (Example 3) of the particle transport stage.

Although the vacuum pump illustrated in FIG. 1 is configured such that the downstream ends 7B of the plurality of rotary blades 7 are at the same height as a specific configuration of the plurality of rotary blades 7 that constitutes the uppermost exhaust stage PT (PT1) as illustrated in FIG. 2A, there is no limitation thereto. For example, as illustrated in FIG. 7A, a configuration (hereinafter referred to as a "lifting structure") in which the downstream end 7B of the preceding blade 7 (73) recedes toward the inlet port 2 more than the downstream ends 7B of the other rotary blades 7 may be employed. Moreover, as illustrated in FIG. 7B, a portion of the downstream end 7B of the preceding blade 7 (73) may be cut to realize a lifting structure.

Referring to FIGS. 7A and 7B, when the raised structure is employed, exhaust direction reflecting particles reflected by colliding with the front inclined surface FS of the blade NB rarely collide with the rear surface of the preceding blade 7 (73), the number of particles (one kind of back-flowing particles) rebounding toward the inlet port 2 by being reflected due to collision with the rear surface of the preceding blade 7 (73) decreases, and a particle exhaust efficiency is improved further.

Another Embodiment (Example 4) of Particle Transport Stage PN

Although the vacuum pump P1 illustrated in FIG. 1 employs a structure (hereinafter referred to as a "single-side extended blade structure") in which the upstream ends 7A of the plurality of rotary blades 7 form an offset structure (that is, a structure in which the upstream end 7A of the rotary blade 7 is raised by being extended by the blade NB), there is no limitation thereto.

Figure 8:
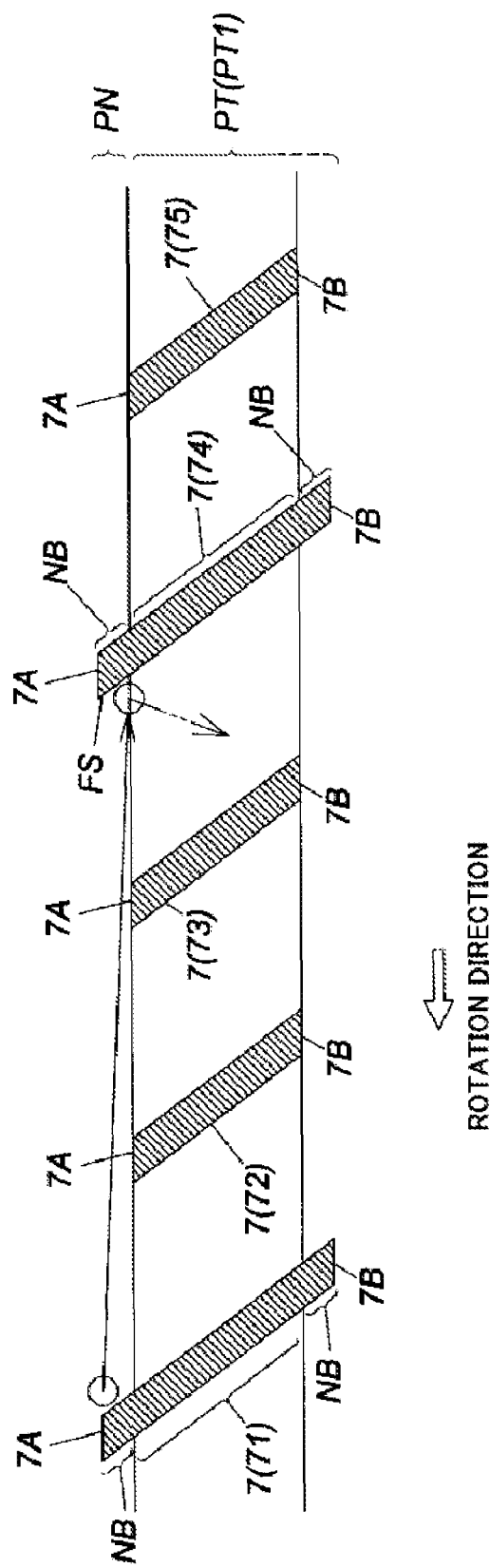
FIG. 8 is an explanatory diagram of another embodiment (Example 4) of the particle transport stage.

For example, in addition to the single-side extended blade structure, as illustrated in FIG. 8, a structure (hereinafter referred to as a "both-side extended blade structure") in which the downstream ends 7B of the rotary blades 7 (71, 74) of which the upstream ends 7A are raised by the offset structure are extended to be longer than the downstream ends 7B of the other rotary blades 7 (72, 73, and 75) may be employed. As a specific configuration example of the both-side extended blade structure, although the downstream ends 7B of the rotary blades 7 (71, 74) are extended by the blade NB equivalent to the blade NB used for realizing the offset structure in FIG. 8, there is no limitation to such an extension form.

By the way, since the rotary blade 7 rotates integrally with the rotor 6, the centrifugal force of this rotation acts in a direction from a fixed end of the rotary blade 7 to a free end or in a radial direction from the center (specifically, the shaft center of the rotor shaft 5) of rotation of the rotary blade 7. General rotary blades 7 are provided so that the shape is symmetrical about a straight line (hereinafter referred to a shape center of a blade) that is vertical to and in a radial direction to a rotation axis (specifically, the rotor shaft 5). This is to suppress a risk that the efficiency of force generated in the rotary blade 7 becomes unbalanced about the shape center of the rotary blade 7 due to the centrifugal force of the rotation, as a result, torsional moment is generated in the root portion (a fixed end) of the rotary blade 7, and the rotary blade 7 is destroyed due to fatigue.

In the single-side extended blade structure described earlier, since the upstream end 7A only of the rotary blade 7 is extended, the torsional moment about the shape center of the rotary blade 7 is likely to be unbalanced, and due to the torsional moment, the rotary blade 7 may be damaged in such a way that the portion near the fixed end of the rotary blade 7 (that is, a portion positioned close to the outer peripheral surface of the rotor 6) is destroyed due to fatigue.

In contrast, in the both-side extended blade structure described earlier, since equivalent blades NB are provided at both the upstream ends 7A and the downstream ends 7B of the rotary blades 7 (71, 74), the torsional force rarely occurs and damage of the rotary blade 7 such as fatigue destruction due to torsional force will rarely occur.

Another Embodiment (Example 5) of Particle Transport Stage PN

In the vacuum pump P1 illustrated in FIG. 1, although a configuration in which the blade NB is provided adjacent to the rotary blade 7 that constitutes the uppermost exhaust stage PT1 is employed as a specific configuration of the blade NB that constitutes the particle transport stage PN, and a structure (see FIG. 2A) in which the blade NB and the rotary blade 7 are provided integrally as a single component as a specific configuration example of the adjacent configuration, there is no limitation thereto.

Figure 9:
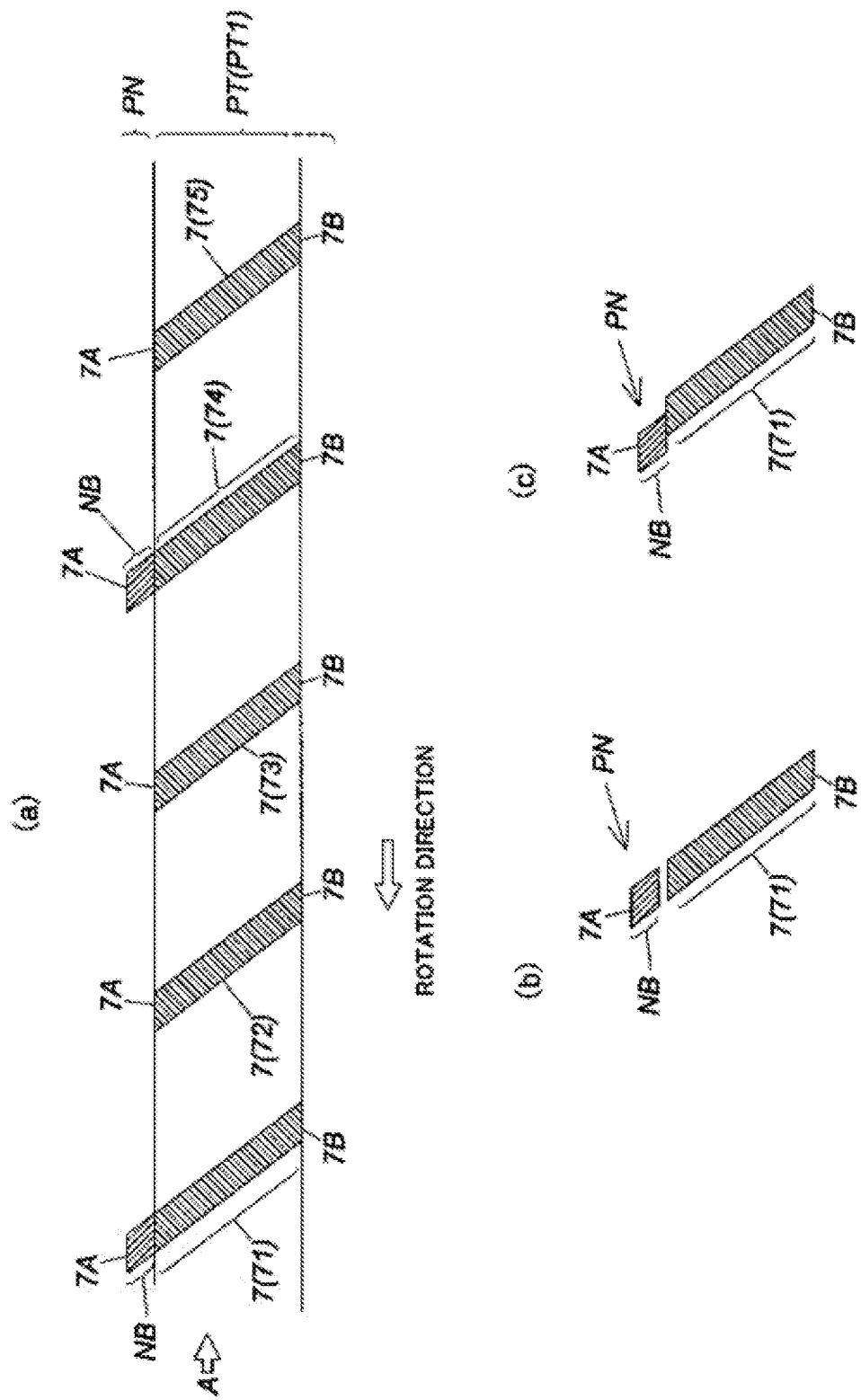
FIGS. 9A, 9B, and 9C are explanatory diagrams of another embodiment (Example 5) of the particle transport stage.

As another specific configuration example of the adjacent configuration, for example, as illustrated in FIG. 9A, a configuration in which the blade NB that constitutes the particle transport stage PN is attached as a separate component to an entire portion or a portion of at least one rotary blade 7 (71, 74) among the plurality of rotary blades 7 that constitutes the uppermost exhaust stage PT (PT1) may be employed. In the configuration of the separate component, since description of "the entire portion or a portion of the rotary blade" is equivalent to the description in "Another Embodiment (Example 1) of Particle Transport Stage PN", the detailed description thereof will be omitted.

When the blade NB configured as the separate component is employed, since due to the blade NB as the separate component, the plurality of rotary blades 7 that constitutes the uppermost exhaust stage PT (PT1) has an offset structure in which the heights of the upstream ends 7A are different, the above-described effects (an increase in the proportion of exhaust direction reflecting particles and a decrease in the proportion of back-flowing particles) are obtained.

When the blade NB configured as the separate component is employed, a gap as illustrated in FIG. 9B or a relative offset as illustrated in FIG. 9C, for example, may be created between the blade NB that constitutes the particle transport stage PN and the rotary blade 7 (71) that constitutes the uppermost exhaust stage PT (PT1). The configuration in which a gap or an offset is created also falls within the "adjacent" configuration, and the above-described effects (an increase in the proportion of exhaust direction reflecting particles and a decrease in the proportion of back-flowing particles) are obtained. The gap or the offset may be formed actively according to design needs and may be formed inevitably due to machining accuracy.

In a configuration in which the blade NB that constitutes the particle transport stage PN is configured as a separate component, the configurations of "Another Embodiment (Example 1) of Particle Transport Stage PN" to "Another Embodiment (Example 4) of Particle Transport Stage PN" may be applied.

In the configuration in which the blade NB is employed as a separate component, the blade NB (that is, the blade NB that constitutes the particle transport stage PN) and the rotary blade 7 (71) that constitutes the uppermost exhaust stage PT (PT1) have a structure in which the respective blade surfaces oppose each other, and a stationary component such as the stationary blade 8, for example, is not disposed between the opposed blade surfaces. The same is applied to the blade integrated structure (see FIG. 2A) described earlier.

Another Embodiment (Example 6) of Particle Transport Stage PN

Although the vacuum pump illustrated in FIG. 1 employs a configuration in which the blade NB that constitutes the particle transport stage PN is provided adjacent to the rotary blade 7 that constitutes the uppermost exhaust stage PT (PT1) as a specific configuration of the particle transport stage PN, there is no limitation thereto.

Figure 10:
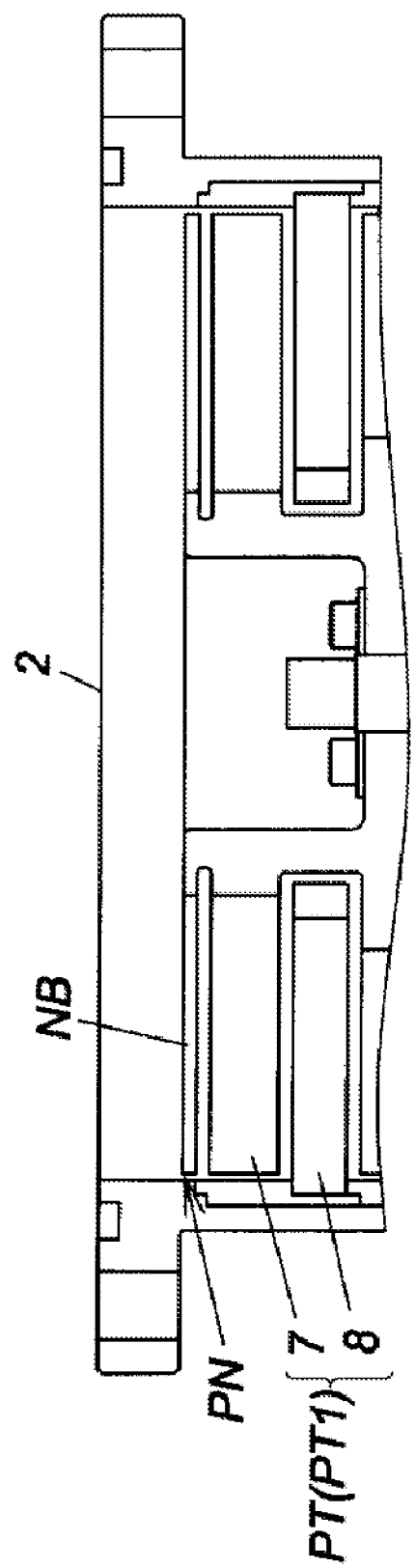
FIG. 10 is an explanatory diagram of another embodiment (Example 6) of the particle transport stage.

For example, as illustrated in FIG. 10, a configuration in which the blade NB that constitutes the particle transport stage PN is provided at a position separated by a predetermined distance from the rotary blade 7 that constitutes the uppermost exhaust stage PT (PT1) may be employed. With such a configuration, the above-described effects (an increase in the proportion of exhaust direction reflecting particles and a decrease in the proportion of back-flowing particles) are obtained.

Another Embodiment (Example 7) of Particle Transport Stage PN

Figure 11:
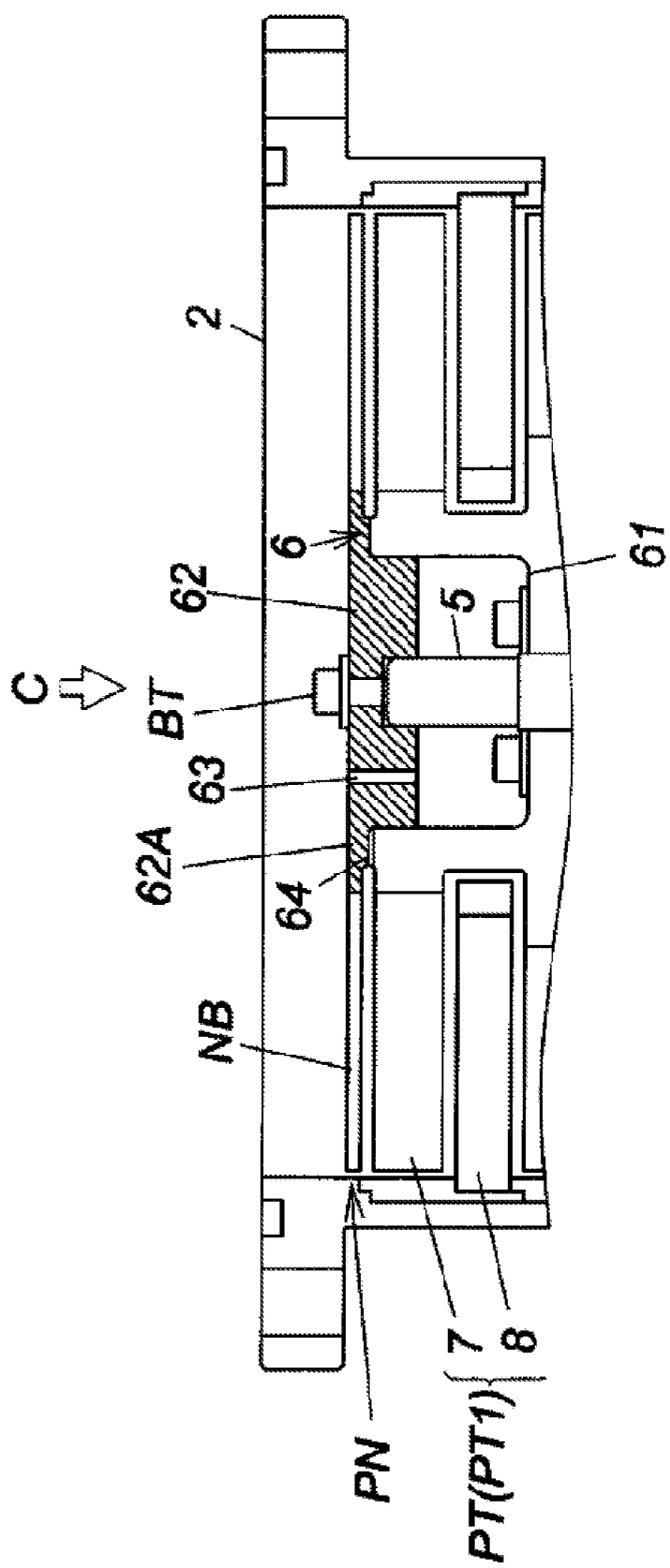
FIG. 11 is an explanatory diagram of another embodiment (Example 7) of the particle transport stage.

In a configuration in which the blade NB that constitutes the particle transport stage PN is attached as a separate component as illustrated in FIG. 9A, a specific attachment structure of the blade NB may employ a method in which, for example, as illustrated in FIG. 11, a first attachment member 62 that can be fitted into the concave portion 61 of the upper end surface of the rotor 6 is prepared, and the first attachment member 62 and the distal end of the rotor shaft 5 are fixed by fastening using a bolt BT in a state in which the blade NB is supported by the outer peripheral surface (specifically, the outer peripheral surface of the flange 62A provided on the outer periphery of the first attachment member 62) of the first attachment member 62 and the first attachment member 62 is fitted into the concave portion 61.

As an attachment method of the blade NB using the first attachment member 62, since gas may accumulate in the concave portion 61 of the upper end surface of the rotor 6, it is desirable to include a ventilation means that a venting hole 63 is formed in the first attachment member 62, or a venting groove 64 is formed between the upper end surface of the rotor 6 and the flange 62A of the first attachment member 62.

Figure 12:
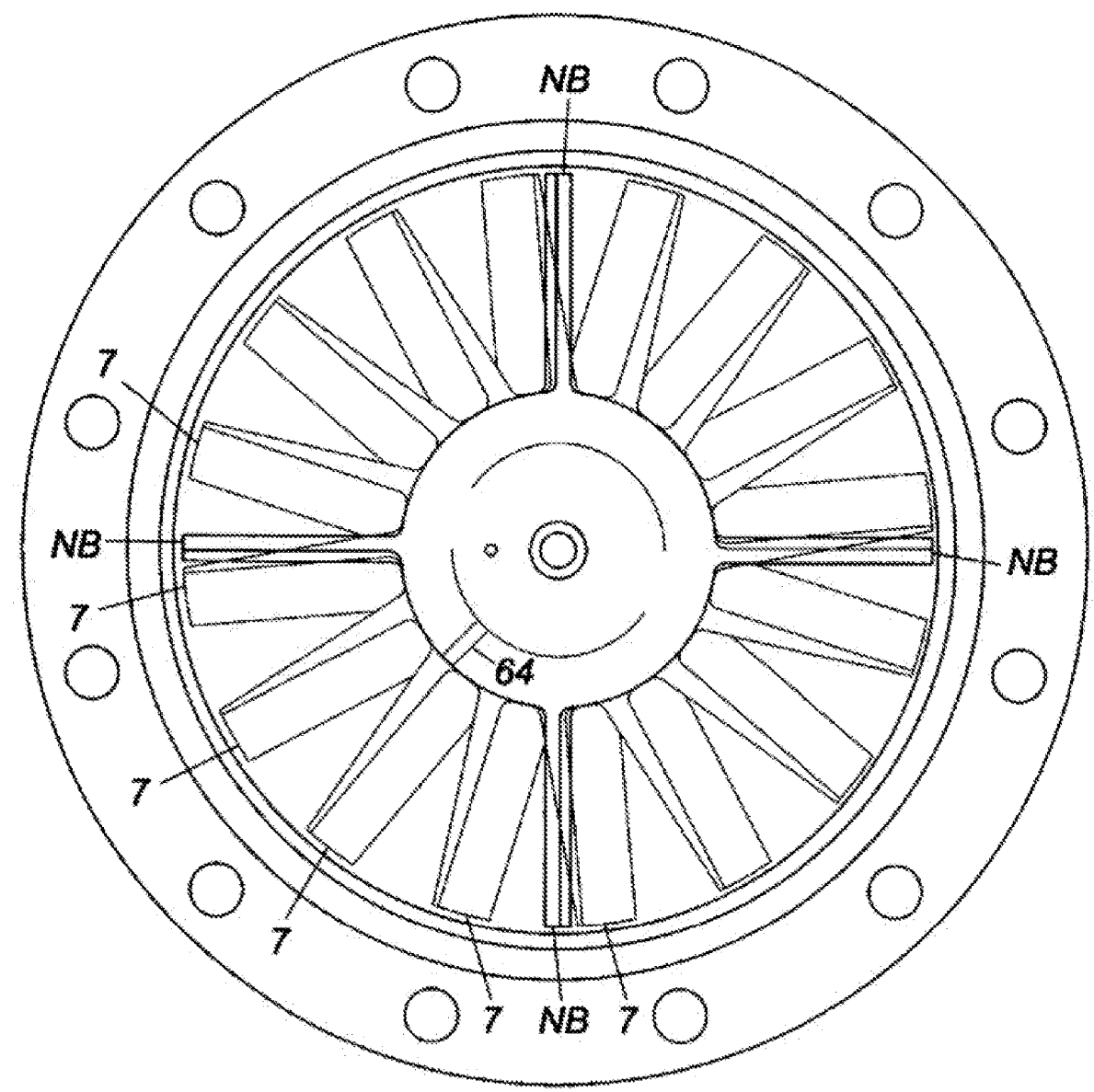
FIG. 12 is a perspective view along arrow C in FIG. 11.

In order to achieve rotation balance of an entire rotating body including the rotor 6 and the rotary blade 7, the blade NB illustrated in FIG. 11 is disposed so as to be rotationally symmetrical as illustrated in FIG. 12 when seen from the rotation center of the rotating body. Such an arrangement configuration can be applied to the blade NB illustrated in FIGS. 1 to 10 (except FIG. 3) and the blade NB illustrated in FIGS. 13 and 14.

Another Embodiment (Example 8) of Particle Transport Stage PN

Figure 13:
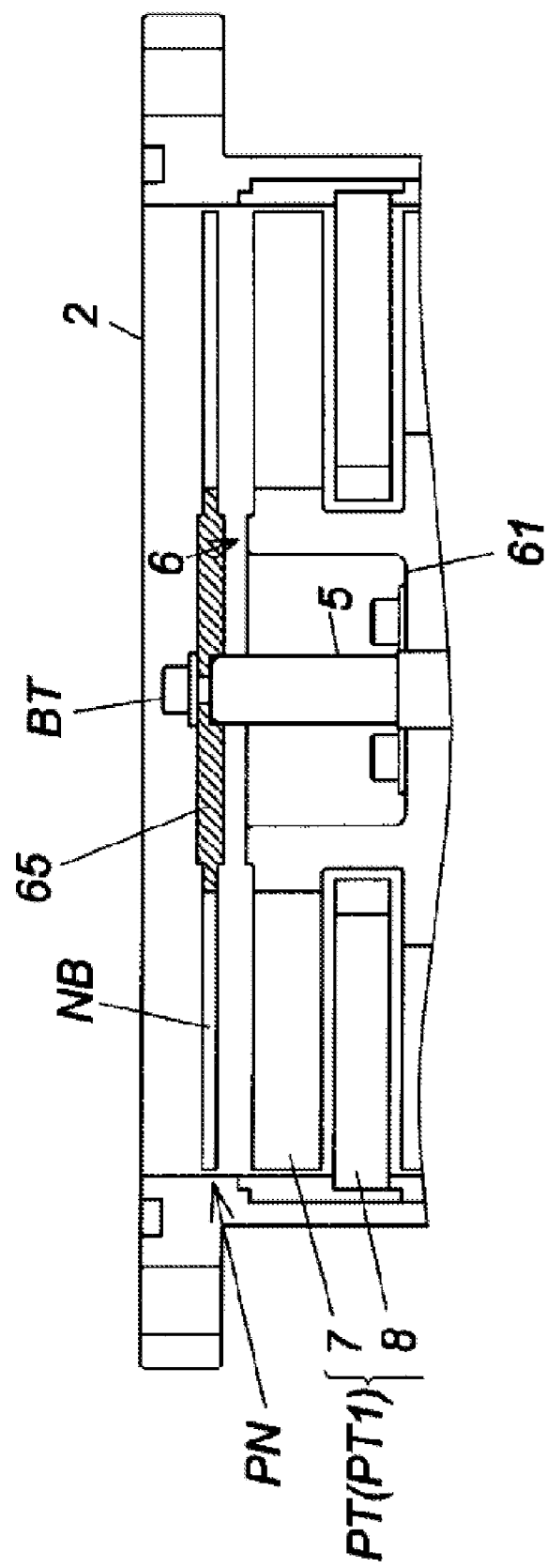
FIG. 13 is an explanatory diagram of another embodiment (Example 8) of the particle transport stage.

The specific attachment structure of the blade NB configured as a separate component may employ an attachment structure illustrated in FIG. 13, for example. In the attachment structure illustrated in FIG. 13, a second attachment member 65 that can be attached to a distal end of the rotor shaft 5 is prepared, the blade NB is supported by an outer peripheral surface of the second attachment member 65, and the second attachment member 65 and the distal end of the rotor shaft 5 are fixed by fastening using a bolt BT.

Another Embodiment (Example 9) of Particle Transport Stage PN

As a specific attachment structure of the blade configured as a separate component, a method in which the blade is fixed to an upper end of the rotor 6 close to the inlet port by fastening using a bolt may be employed, which is not illustrated.

Another Embodiment (Example 10) of Particle Transport Stage PN

Although the vacuum pump P1 illustrated in FIG. 1 employs a configuration ($\theta1=\theta2$), as illustrated in FIG. 2A, an elevation angle $\theta1$ of the blade NB that constitutes the particle transport stage PN and an elevation angle $\theta2$ of the plurality of rotary blades 7 that constitutes the uppermost exhaust stage PT (PT1) are equal, there is no limitation thereto.

Figure 14:
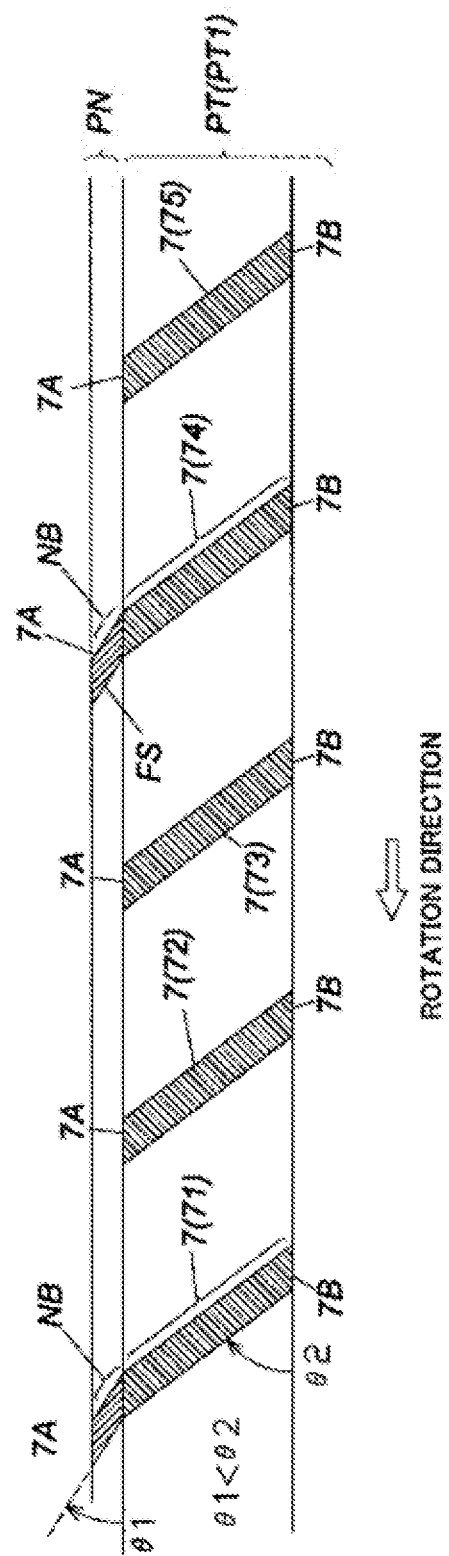
FIG. 14 is an explanatory diagram of another embodiment (Example 10) of the particle transport stage.

For example, the elevation angle may be set as illustrated in FIG. 14 ($\theta1<\theta2$), that is, an elevation angle $\theta1$ of the blade NB that constitutes the particle transport stage PN is smaller than an elevation angle $\theta2$ of the rotary blade 7 that constitutes the uppermost exhaust stage PT (PT1).

When the elevation angle configuration is employed, the blade NB that constitutes the particle transport stage PN overhangs the rotary blades 7 (71, 74) that form the uppermost exhaust stage PT (PT1), and particles are reflected in a direction toward a space between the lower ends of the blades more than the direction toward the preceding blade (that is, at an angle of a direction closer to a downward direction of an axial direction of the rotating body (specifically, a rotating body including the rotor 6 and the rotary blade 7)). Therefore, exhaust direction reflecting particles reflected by colliding with the front inclined surface FS of the blade NB rarely collide with the rear surface of the preceding blade 7 (73), the number of particles (one kind of back-flowing particles) rebounding toward the inlet port 2 by being reflected due to collision with the rear surface of the preceding blade 7 (73) decreases, and a particle exhaust efficiency is improved further.

The elevation angle setting may be applied not only to a configuration in which the blade NB is provided as a separate component as illustrated in FIG. 14 but also to a configuration in which the blade NB and the rotary blade 7 are provided integrally as illustrated in FIG. 6.

Another Embodiment (Examples 11-1 and 11-2) of Particle Transport Stage PN

The heights (depths) of steps in the offset structure are not limited to one kind, but the offset structure may have a combination of heights (depths) of a plurality of steps. For example, the offset structure may be formed in a form of stairs (see FIG. 15) and may be formed in such a shape that the height changes in a tapered form (see FIG. 16). Although not illustrated in the drawings, as a combination example of the heights (depths) of a plurality of steps, a configuration in which the heights (depths) of the steps are different (a configuration in which step heights or depths are irregular) may be employed. That is, a combination of the heights (depths) of the plurality of steps may be changed appropriately as necessary. Moreover, the step height may be changed according to the position in a radial direction of the rotary blade.

Figure 15:
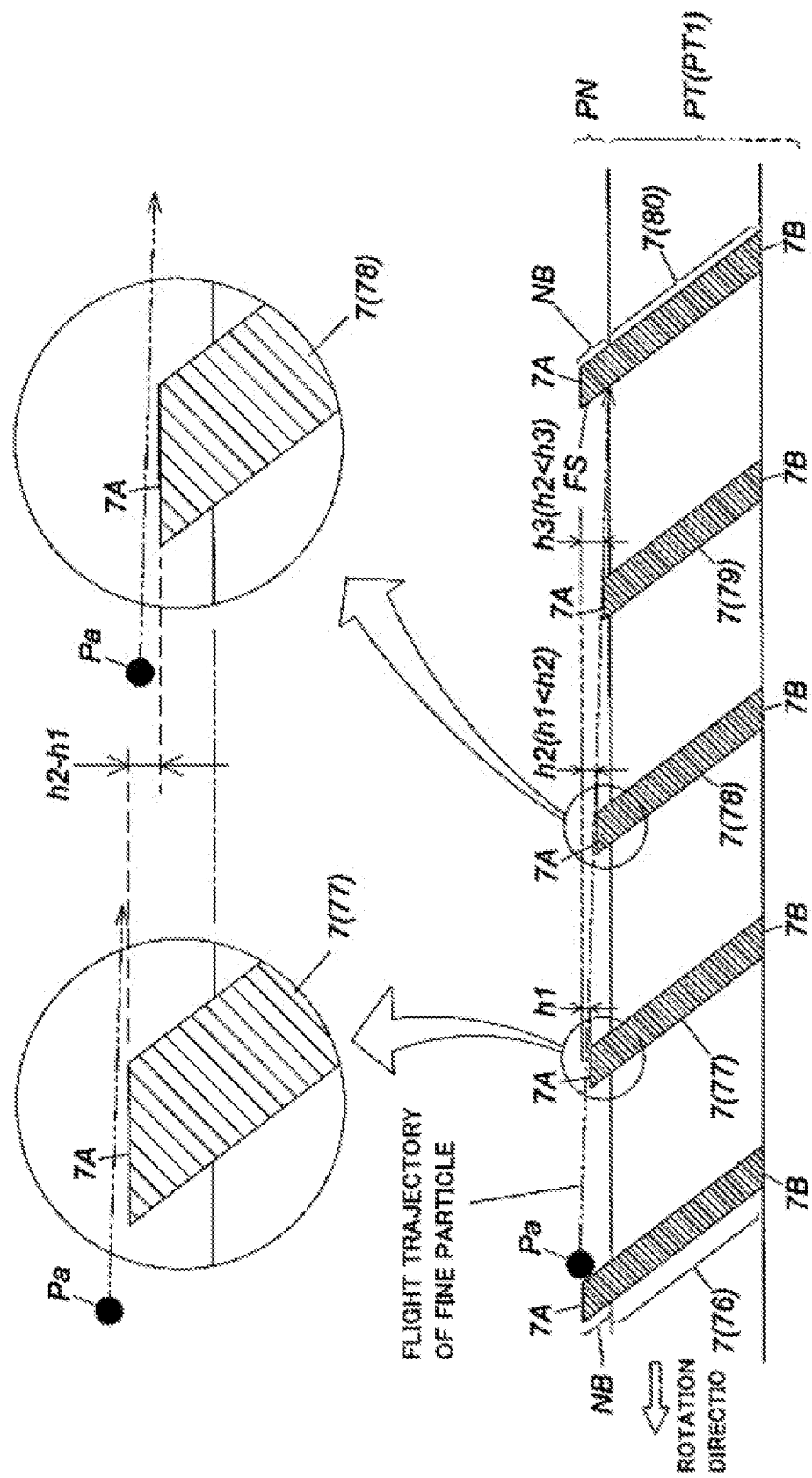
FIG. 15 is an explanatory diagram of another embodiment (Example 11-1) of the particle transport stage.
Figure 16:
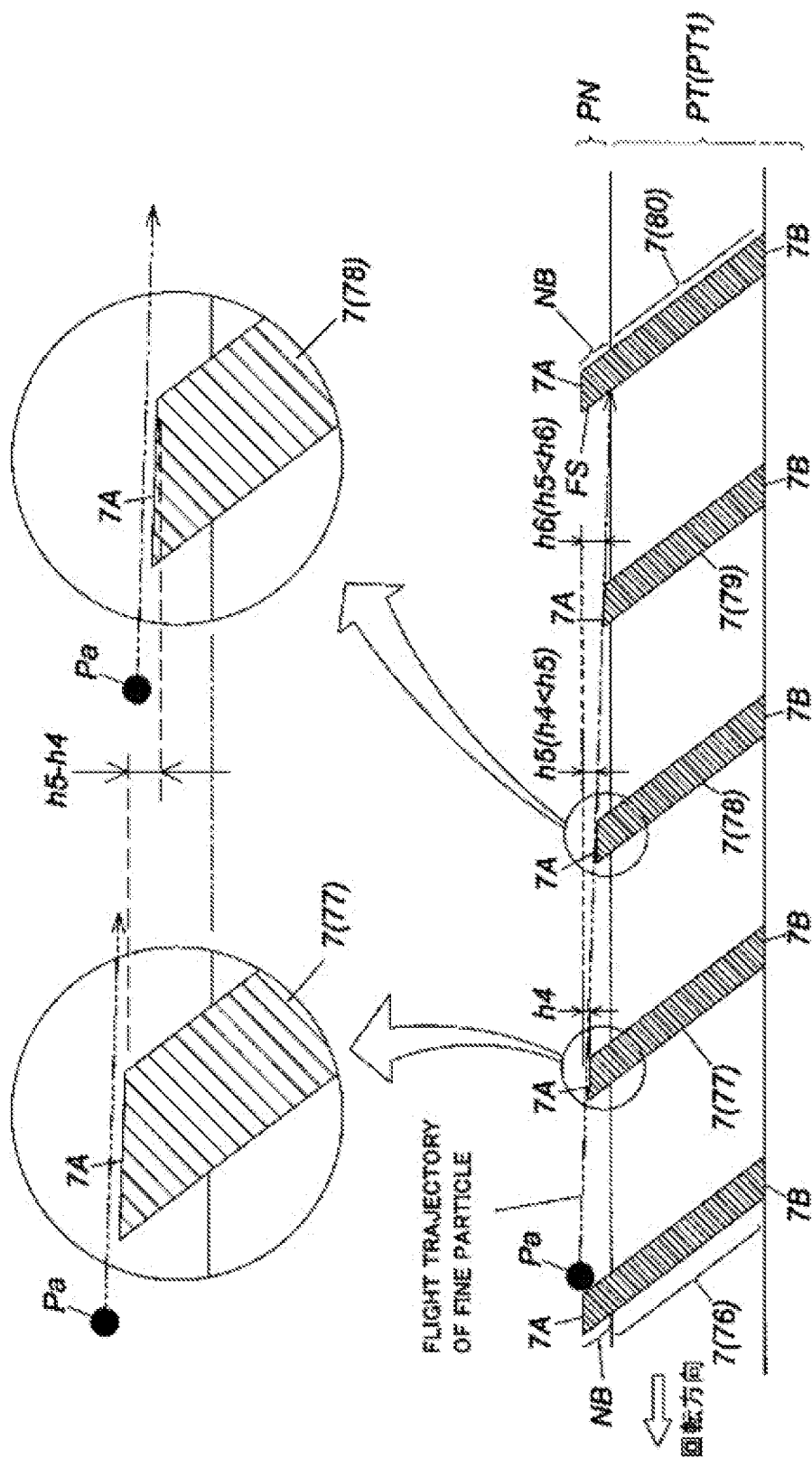
FIG. 16 is an explanatory diagram of another embodiment (Example 11-2) of the particle transport stage.

FIG. 15 is an explanatory diagram of another embodiment (Example 11-1) of the particle transport stage PN (specifically, a configuration in which the step height changes in a form of stairs as a combination example of the heights of a plurality of steps). FIG. 16 is an explanatory diagram of another embodiment (Example 11-2) of the particle transport stage PN (specifically, a configuration in which the step height changes in a tapered form as a combination example of the heights of a plurality of steps).

Here, referring to FIG. 4, for example, in the example of FIG. 4, the heights (depths) of steps of the rotary blades 7 (71, 74) of which the upstream ends 7A are raised by the offset structure and the rotary blades 7 positioned therebetween are uniformly the same as Zp2 or Zp3 that is equal to or larger than Zp2.

In contrast, referring to FIG. 15, in the example of FIG. 15, a configuration (hereinafter referred to as a "stair-shape-type configuration") in which the height (depth) of steps of the offset structure in the n-th rotary blade 7 (80) changes in a stair shape (h1<h2<h3) so as to be equal to or larger than Zp2 is employed.

Therefore, in the stair-shape-type configuration, the heights (depths) h1, h2, and h3 of the steps in the rotary blades 7 (76, 80) of which the upstream ends 7A are raised by the offset structure and the rotary blades 7 (77, 78, 79) positioned therebetween are not uniform but becomes lower (becomes deeper) by one step in that order in the rotation direction of the rotary blade 7. When the stair-shape-type configuration is employed, the fine particles Pa do not collide with the rotary blade 7 (77, 78, 79) as understood from a flight trajectory of the fine particles Pa illustrated in FIG. 15, and the above-described effects (an increase in the proportion of exhaust direction reflecting particles and a decrease in the proportion of back-flowing particles) are obtained.

When the stair-shape-type configuration is employed, the upstream ends 7A of the rotary blades 7 (77, 78, 79) positioned between the rotary blades 7 (76, 80) of which the upstream ends 7A are raised are configured as a flat surface without an inclination.

Referring to FIG. 16, in the example of FIG. 16, a configuration (hereinafter referred to as a "tapered-surface-type configuration") in which the height (depth) of steps of the offset structure in the n-th rotary blade 7 (80) changes (h4<h5<h6) in a tapered form so as to be equal to or larger than Zp2 is employed.

Therefore, in the tapered-surface-type configuration, the heights (depths) h4, h5, and h6 of the steps in the rotary blades 7 (76, 80) of which the upstream ends 7A are raised by the offset structure and the rotary blades 7 (77, 78, 79) positioned therebetween are not uniform but are set so as to continuously become lower (become deeper) as it advances in the rotation direction of the rotary blade 7. When the tapered-surface-type configuration is employed, the fine particles Pa do not collide with the rotary blade 7 (77, 78, 79) as understood from a flight trajectory of the fine particles Pa illustrated in FIG. 16, and the above-described effects (an increase in the proportion of exhaust direction reflecting particles and a decrease in the proportion of back-flowing particles) are obtained.

When the tapered-surface-type configuration is employed, the upstream ends 7A of the rotary blades 7 (77, 78, 79) positioned between the rotary blades 7 (76, 80) of which the upstream ends 7A are raised are configured as an inclined surface inclined at a predetermined angle.

However, since the ratio of the arrangement interval of the rotary blades 7 to the height is set to an optimal value so that gas molecules can be transported effectively to the downstream side, if the heights of the rotary blades 7 are different, some rotary blades 7 may deviate from the optimal setting value and an overall exhaust performance of the vacuum pump may decrease. Therefore, it is desirable that the difference in height of the rotary blades 7 is small from the viewpoint of securing an exhaust performance.

In this respect, in the stair-shape-type configuration illustrated in FIG. 15 and the tapered-surface-type configuration illustrated in FIG. 16, since a configuration in which the heights of steps of the offset structure in the n-th rotary blade 7 (80) change in a form of stairs or a tapered form so as to be equal to or larger than Zp2, even if a height-reduced offset structure to be described later, for example, is employed, the difference in height of the rotary blades 7 decreases and decrease in the exhaust performance rarely occurs. The stair-shape-type configuration illustrated in FIG. 15 and the tapered-surface-type configuration illustrated in FIG. 16 may naturally be applied not only to the height-reduced offset structure to be described later but also to the offset structure described above.

Another Embodiment of Present Invention Near Particle Transport Stage PN

Figure 17:
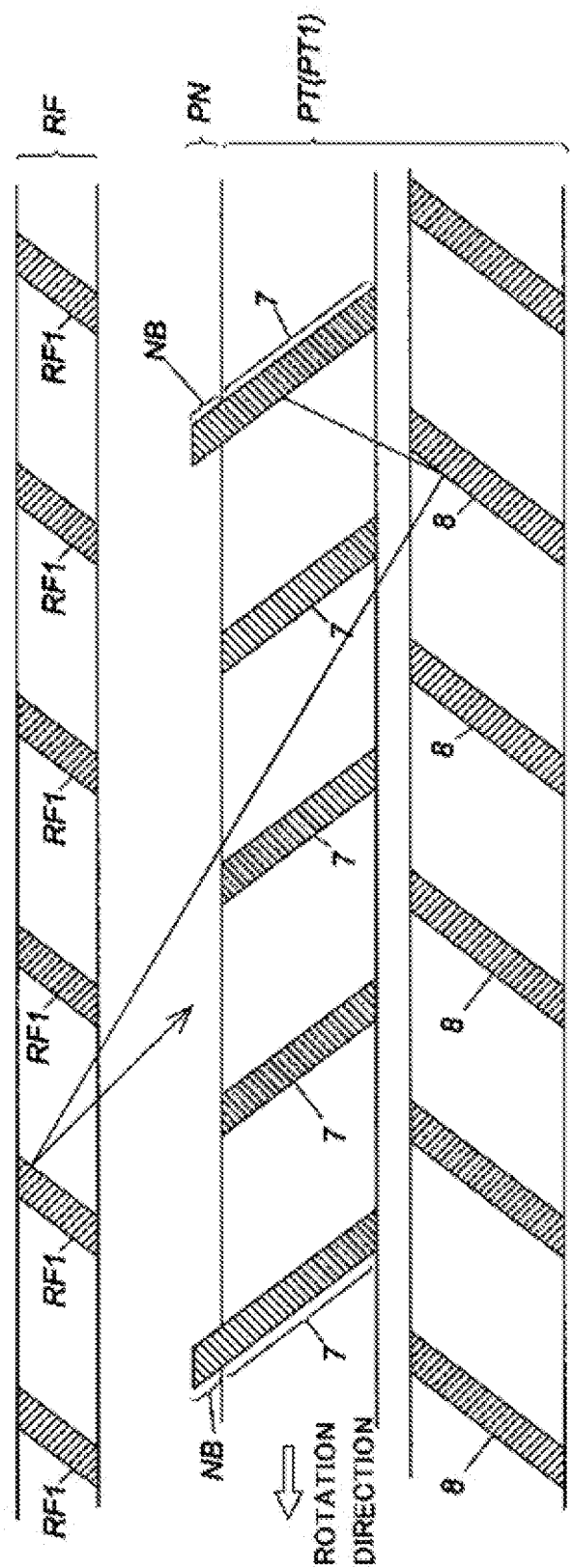
FIG. 17 is an explanatory diagram of another embodiment of the present invention near a particle transport stage.

FIG. 17 is an explanatory diagram of another embodiment of the present invention near the particle transport stage PN. In the embodiment illustrated in FIG. 17, a stationary blade RF1 (hereinafter referred to as a "stationary reflecting blade RF1") inclined at the same angle as but in the opposite direction to the plurality of rotary blades 7 that constitutes the uppermost exhaust stage PT (PT1) is provided on the upstream side (specifically, an upstream side than the particle transport stage PN) of the uppermost exhaust stage PT (PT1) as a reflecting means RF.

Referring to FIG. 17, fine particles Pa are reflected in a downstream direction from the rotary blade 7 (hereinafter referred to as an "uppermost rotary blade 7") that constitutes the exhaust stage PT (PT1) and move toward the stationary blade 8 (hereinafter referred to as an "uppermost stationary blade 8") that constitutes the exhaust stage PT (PT1). In this case, as illustrated in FIG. 17, some of the moving fine particles Pa are highly likely to be reflected again from the rear surface or the upper end surface of the uppermost stationary blade 8 whereby the fine particles pass through a space between the uppermost rotary blades 7 at a predetermined velocity and flow back toward the inlet port 2 or the vacuum chamber CH ahead the inlet port 2 without entering the front surface of the uppermost rotary blade 7.

The reflecting means RF functions as means for preventing backflow of fine particles Pa (hereinafter referred to as "re-reflected fine particles Pa") due to re-reflection in the uppermost stationary blade 8. That is, as illustrated in FIG. 17, the re-reflected fine particles Pa are reflected from the stationary reflecting blade RF1 and move toward the uppermost exhaust stage PT (PT1).

However, the back-flowing re-reflected fine particles Pa pass through a space between the uppermost rotary blades 7 at a predetermined velocity, the re-reflected fine particles Pa have a velocity component in a direction (a rotation direction) parallel to an inclination of the uppermost rotary blade as a velocity component necessary for the passing. Due to this, in the embodiment illustrated in FIG. 17, as described above, the stationary reflecting blade RF1 is configured to be inclined at the same angle as but in the opposite direction to the uppermost rotary blade 7 so that the back-flowing re-reflected fine particles Pa can be effectively caught by the stationary reflecting blade RF1.

The number of stationary reflecting blades RF1 and the inclination angle can be changed appropriately as necessary by taking reflection of the fine particles Pa by the stationary reflecting blade RF1 and an overall exhaust efficiency of the vacuum pump into consideration.

Although the embodiment illustrated in FIG. 17 employs a configuration in which the reflecting means RF is provided on a downstream side of the inlet port 2 of the vacuum pump P1 so that the reflecting means RF is disposed in the vacuum pump P1, there is no limitation thereto. Although not illustrated in the drawings, the reflecting means RF may be provided in the middle of a path that connects the vacuum pump P1 and the vacuum chamber CH, for example.

The present invention is not limited to the above-described embodiments, and various modifications may be made within the technical idea of the present invention by those who have ordinary knowledge in the art.

For example, the configurations of "Another Embodiment (Example 1) of Particle Transport Stage PN" to "Another Embodiment (Example 11-2) of Particle Transport Stage PN" and the configuration of "Another Embodiment of Present Invention Near Particle Transport Stage PN" may be used in appropriate combinations as necessary.

The vacuum pump according to the above-described embodiments includes a plurality of exhaust stages PT provided between the inlet port 2 and the exhaust port 3 so as to function as means for exhausting gas molecules and each of the plurality of exhaust stages PT has a structure in which gas molecules are exhausted by the plurality of rotary blades 7 and the plurality of stationary blades 8 arranged at a predetermined interval in a radial form. In the plurality of exhaust stages PT having such a structure, a height-reduced offset structure, that is, an offset structure in which the heights of the upstream ends 7A of at least some of the plurality of rotary blades 7 that constitutes the uppermost exhaust stage PT1 are decreased (height-reduced) so that the heights of the upstream ends 7A are different may be achieved, and a particle transport stage in which particles are moved in an exhaust direction of gas molecules may be achieved. Such a particle transport stage equally functions as the particle transport stage PN.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump including a plurality of exhaust stages provided between an inlet port and an exhaust port so as to function as means for exhausting gas molecules, each of the plurality of exhaust stages having a structure in which the gas molecules are exhausted by a plurality of rotary blades and a plurality of stationary blades disposed at a predetermined interval in a radial form, the vacuum pump comprising:

a number of particle transport blades provided between the inlet port and an uppermost exhaust stage of the plurality of exhaust stages so as to rotate together with the plurality of rotary blades that constitutes the uppermost exhaust stage as a particle transport stage that transports a particle in an exhaust direction of the gas molecules, the number of particle transport blades being smaller than the number of the plurality of rotary blades that constitutes the uppermost exhaust stage, wherein the particle that is reflected off one of the particle transport blades enters a flow path defined in part by a rotary blade that is adjacent to the particle transport blade that the particle reflected off, and a height of the particle transport blades is set to be equal to or larger than Zp2 of Equation (1) below $$Zp2=\{(\pi D \cdot n/N)Vp\}/(Vr) \quad (1)$$

Zp2: A step
D: Outer diameter of the particle transport blades
n: Number of the rotary blades positioned between the particle transport blades
N: Number of the rotary blades that form uppermost exhaust stage
Vp: Velocity of the particle at an upper end of the particle transport blades
Vr: Rotation velocity of the rotary blades when a process is performed.

2. The vacuum pump according to claim 1, wherein
the particle transport blades are provided adjacent to the plurality of rotary blades that constitutes the uppermost exhaust stage.

3. The vacuum pump according to claim 1, wherein
the particle transport blades are provided integrally with an entire portion or a portion of at least one rotary blade of the plurality of rotary blades that constitutes the uppermost exhaust stage.

4. The vacuum pump according to claim 1, wherein
a height of a rotary blade adjacent to the particle transport blade among the plurality of rotary blades that constitutes the uppermost exhaust stage is extended by the particle transport blade such that the plurality of rotary blades that constitutes the uppermost exhaust stage has an offset structure in which heights of upstream ends of the rotary blades are different.

5. The vacuum pump according to claim 4, wherein
an arrangement interval of a rotary blade of which the upstream end is raised by the offset structure and a rotary blade positioned on a front side in a rotation advancing direction of the rotary blade among the plurality of rotary blades that constitutes the uppermost exhaust stage is larger than an arrangement interval between two successive rotary blades of which the upstream ends are not raised by the offset structure.

6. The vacuum pump according to claim 4, wherein
a downstream end of the rotary blade positioned on the front side in the rotation advancing direction of the rotary blade of which the upstream end is raised by the offset structure among the plurality of rotary blades that constitutes the uppermost exhaust stage recedes toward the inlet port more than the downstream end of another rotary blade of the plurality of rotary blades.

7. The vacuum pump according to claim 4, wherein
the downstream end of the rotary blade of which the upstream end is raised by the offset structure among the plurality of rotary blades that constitutes the uppermost exhaust stage is extended to be longer than the downstream end of another rotary blade of the plurality of rotary blades.

8. The vacuum pump according to claim 4, wherein
the height of the particle transport blades changes in a form of stairs.

9. The vacuum pump according to claim 4, wherein
the height of the particle transport blades changes in a tapered form.

10. The vacuum pump according to claim 1, wherein
the blade that constitutes the particle transport stage is attached as a separate component to an entire portion or a portion of at least one rotary blade among the plurality of rotary blades that constitutes the uppermost exhaust stage.

11. The vacuum pump according to claim 1, wherein
an elevation angle of the blade that constitutes the particle transport stage is set to be smaller than an elevation angle of the plurality of rotary blades that constitutes the uppermost exhaust stage.

12. The vacuum pump according to claim 1, wherein
the blade that constitutes the particle transport stage is provided at a position separated from the plurality of rotary blades that constitutes the uppermost exhaust stage.

13. A blade component which is used in the vacuum pump according to claim 1 and includes the blade that constitutes the particle transport stage.

14. A vacuum pump including a plurality of exhaust stages provided between an inlet port and an exhaust port so as to function as means for exhausting gas molecules, each of the plurality of exhaust stages having a structure in which the gas molecules are exhausted by a plurality of rotary blades and a plurality of stationary blades disposed at a predetermined interval in a radial form, wherein
heights of upstream ends of at least some of the plurality of rotary blades that constitutes an uppermost exhaust stage are lowered such that an offset structure in which the heights of the upstream ends are different is achieved and a particle transport stage in which a particle is moved in an exhaust direction of the gas molecules is achieved, wherein
the particle reflected on a tall blade among a number of tall blades in the offset structure in which the heights are different enters a channel defined by a lower extent of the tall blade,
the number of the tall blades among the offset structure is smaller than a number of short blades among the offset structure in which the heights are different, and
at least part of a protruding height of a protruding portion of the offset structure is set equal to or greater than $Zp2$ of Equation (2) below $$Zp2 = \{(\pi D \cdot n/N)Vp\}/(Vr) \qquad (2)$$

$Zp2$: A step
D: Outer diameter of the tall blades
n: Number of the rotary blades positioned between the tall blades
N: Number of the rotary blades that form uppermost exhaust stage
Vp: Velocity of the particle at an upper end of the tall blades
Vr: Rotation velocity of the tall blades when a process is performed.

15. The vacuum pump according to claim 14, wherein
the protruding height changes in a form of stairs.

16. The vacuum pump according to claim 14, wherein
the protruding height changes in a tapered form.

17. A rotor which is used in the vacuum pump according to claim 14 and includes the blade that constitutes the particle transport stage.

18. The vacuum pump according to claim 14, wherein
a stationary blade inclined at the same angle as but in the opposite direction to the plurality of rotary blades that constitutes the uppermost exhaust stage is provided on an upstream side of the uppermost exhaust stage as a reflecting means.

19. A stationary blade which is used in the vacuum pump according to claim 18 and is the stationary blade provided on an upstream side of the uppermost exhaust stage as the reflecting means so as to be inclined at the same angle as but in the opposite direction to the plurality of rotary blades that constitutes the uppermost exhaust stage.

* * * * *